(12) United States Patent
Asai

(10) Patent No.: US 9,982,608 B2
(45) Date of Patent: May 29, 2018

(54) ENGINE

(71) Applicant: YANMAR CO., LTD., Osaka-shi, Osaka (JP)

(72) Inventor: Go Asai, Osaka (JP)

(73) Assignee: YANMAR CO., LTD., Osaka-Shi, Osaka (JP)

(*) Notice: Subject to any disclaimer, the term of this patent is extended or adjusted under 35 U.S.C. 154(b) by 0 days. days.

(21) Appl. No.: 15/507,911

(22) PCT Filed: Aug. 31, 2015

(86) PCT No.: PCT/JP2015/074602
§ 371 (c)(1),
(2) Date: Mar. 1, 2017

(87) PCT Pub. No.: WO2016/035735
PCT Pub. Date: Mar. 10, 2016

(65) Prior Publication Data
US 2017/0284315 A1     Oct. 5, 2017

(30) Foreign Application Priority Data

Sep. 5, 2014  (JP) .................................. 2014-181794
Sep. 26, 2014  (JP) .................................. 2014-197367
Sep. 26, 2014  (JP) .................................. 2014-197368
Nov. 17, 2014  (JP) .................................. 2014-233173

(51) Int. Cl.
*F02B 51/00*     (2006.01)
*F02D 21/08*    (2006.01)
(Continued)

(52) U.S. Cl.
CPC .............. *F02D 21/08* (2013.01); *F02B 51/00* (2013.01); *F02D 19/08* (2013.01); *F02D 35/025* (2013.01);
(Continued)

(58) Field of Classification Search
CPC .......... F02B 51/00; F02D 19/08; F02D 21/08; F02M 33/00
(Continued)

(56) References Cited

U.S. PATENT DOCUMENTS 5,178,119 A * 1/1993 Gale ..................... F02B 41/06
                                                  123/568.12
5,297,515 A * 3/1994 Gale ..................... F02M 27/02
                                                  123/3
(Continued)

FOREIGN PATENT DOCUMENTS

EP          0 159 834       10/1985
JP         2007-332891 A    12/2007
(Continued)

OTHER PUBLICATIONS

European Patent Office, EESR in EP15837716.8. dated Oct. 9, 2017, 6 pages.

*Primary Examiner* — Erick Solis
(74) *Attorney, Agent, or Firm* — Hunton Andrews Kurth LLP

(57) ABSTRACT

The purpose of the present invention is to provide an engine with reforming cylinders which are fuel reforming devices capable of supplying a reformed fuel according to the outputs of outputting cylinders. The engine is provided with the outputting cylinders for burning the fuel and the reforming cylinders which are the fuel reforming devices for reforming the fuel through the reciprocating motions of pistons. The amount of reformed fuel supplied to all the outputting cylinders is changed according to the outputs of the outputting cylinders while maintaining the amount of supplied fuel and the amount of suctioned gas, which are supplied into one reforming cylinder.

4 Claims, 21 Drawing Sheets

(51) Int. Cl.
*F02D 19/08* (2006.01)
*F02D 35/02* (2006.01)
*F02M 33/00* (2006.01)

(52) U.S. Cl.
CPC ....... *F02M 33/00* (2013.01); *F02D 2021/083* (2013.01)

(58) Field of Classification Search
USPC ................................................. 123/3, 58.8
See application file for complete search history.

(56) References Cited

U.S. PATENT DOCUMENTS

| | | | |
|---|---|---|---|
| 9,657,692 B2* | 5/2017 | Chiu | F02M 26/28 |
| 2012/0078492 A1* | 3/2012 | Freund | F02D 41/0065 |
| | | | 701/108 |
| 2014/0196697 A1* | 7/2014 | Burrahm | F02M 26/43 |
| | | | 123/568.11 |
| 2015/0337722 A1* | 11/2015 | Bastos | F02M 25/12 |
| | | | 123/3 |
| 2015/0361927 A1* | 12/2015 | Glugla | F02M 25/0749 |
| | | | 60/603 |
| 2015/0369178 A1* | 12/2015 | Asai | F02D 41/0025 |
| | | | 123/3 |
| 2016/0245239 A1* | 8/2016 | Henry | F02M 26/35 |

FOREIGN PATENT DOCUMENTS

| | | |
|---|---|---|
| JP | 2013-231360 A | 11/2013 |
| JP | 2014-136978 A | 7/2014 |
| WO | 2007/044331 A2 | 4/2007 |

* cited by examiner

ENGINE

CROSS-REFERENCE TO RELATED APPLICATIONS

This is a national phase application based on the PCT International Patent Application No. PCT/JP2015/074602 filed Aug. 31, 2015, claiming priority to Japanese Patent Application Nos. 2014-181794, 2014-197367, 2014-197368, and 2014-233173, filed Sep. 5, 2014, Sep. 26, 2014, Sep. 26, 2014 and Nov. 17, 2014, respectively, the entire contents of all of which are incorporated herein by reference.

TECHNICAL FIELD

The present invention relates to an engine, and more specifically, to an engine including a fuel reforming device.

BACKGROUND ART

A premixing engine supplying reformed gas fuel, obtained by premixing intake air and exhaust air in liquid fuel has conventionally been known. The premixing engine features reformation of liquid fuel into gas fuel that can be combusted in a diluted state to be combusted, and thus can achieve smaller amounts of smoke and NOx discharged, as described in Patent Literature 1 for example.

An engine described in Patent Literature 1 reforms fuel by using one of a plurality of cylinders as a reforming cylinder serving as a fuel reforming device to mix the liquid fuel with intake air and exhaust air and compressing the mixture. The reformed fuel can be reformed only when predetermined intake gas temperature, composition, compression rate, and fuel air equivalence ratio are achieved. Thus, the engine is incapable of decreasing the produced amount of reformed fuel by changing the fuel air equivalence ratio achieved by the reformed fuel or changing the intake gas amount, in accordance with an output from outputting cylinders. Thus, the engine might fail to supply an amount of reformed fuel in accordance with the output from the outputting cylinders, and thus might not be able to operate with an appropriate amount of fuel.

CITATION LIST

Patent Literature

PTL 1: Japanese Unexamined Patent Application Publication No. 2007-332891

SUMMARY OF INVENTION

Technical Problem

The present invention has been made in light of the aforementioned circumstances, and an object of the present invention is to provide an engine including a fuel reforming device that can supply reformed fuel in accordance with an output from an outputting cylinder.

Solution to Problem

Specifically, in the present invention, an engine includes an outputting cylinder configured to combust fuel, and a reforming cylinder configured to reform the fuel through back and forth movement of a piston. An amount of reformed fuel supplied to the outputting cylinder is changed in accordance with an output from the outputting cylinder, while maintaining an amount of supplied fuel and an amount of suctioned gas to one reforming cylinder.

In the present invention, at least one of a compression rate and an expansion rate of the reforming cylinder is changed based on temperature of reformed fuel discharged from the reforming cylinder.

In the present invention, the reforming cylinder includes an expansion chamber a volume of which changes in accordance with the back and forth movement of the piston, and a reaction chamber with a constant volume, and the expansion chamber and the reaction chamber are in communication with each other.

In the present invention, the reforming cylinder is coupled with an intake air pipe through which intake air from outside is supplied and an EGR pipe through which exhaust air from the outputting cylinder is supplied, and the reforming cylinder is provided with a fuel injection device that supplies fuel to a mixture of the intake air and the exhaust air supplied to the reforming cylinder and an additive injection device that supplies an additive based on an amount of supplied fuel and an amount of the mixture.

Advantageous Effects of Invention

The present invention has the following advantageous effects.

Specifically, in the present invention, the amount of reformed fuel supplied to the outputting cylinder is changed, while maintaining the amount of reformed fuel discharged from each reforming cylinder and a fuel air equivalence ratio of the reformed fuel. Thus, the reformed fuel can be supplied in accordance with the output of the outputting cylinder.

DESCRIPTION OF EMBODIMENTS

An engine 1 as one embodiment of an engine according to the present invention is described with reference to FIG. 1 to FIG. 8.

Figure 1:
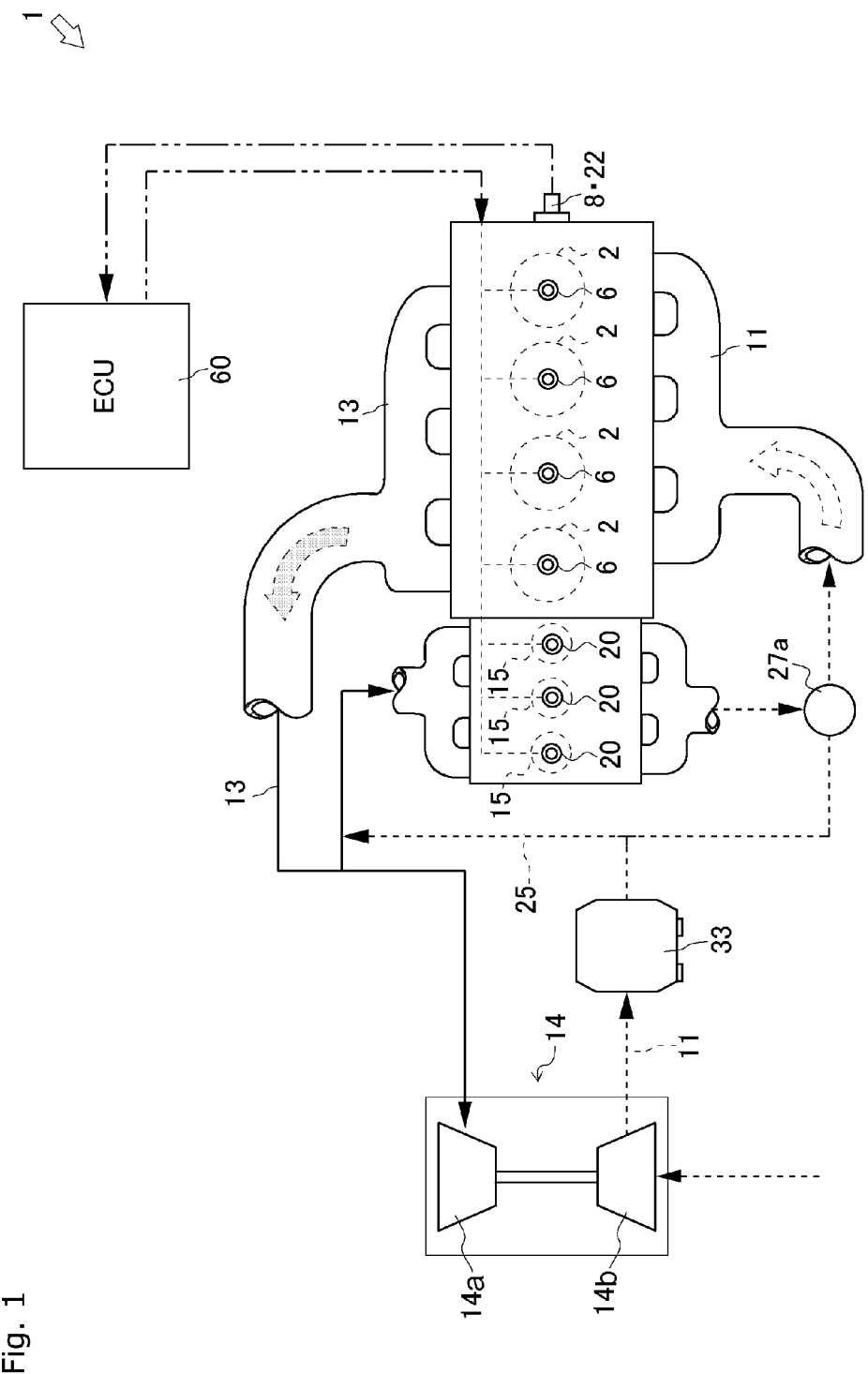
FIG. 1 is a schematic view illustrating one embodiment of an engine according to the present invention.
Figure 2:
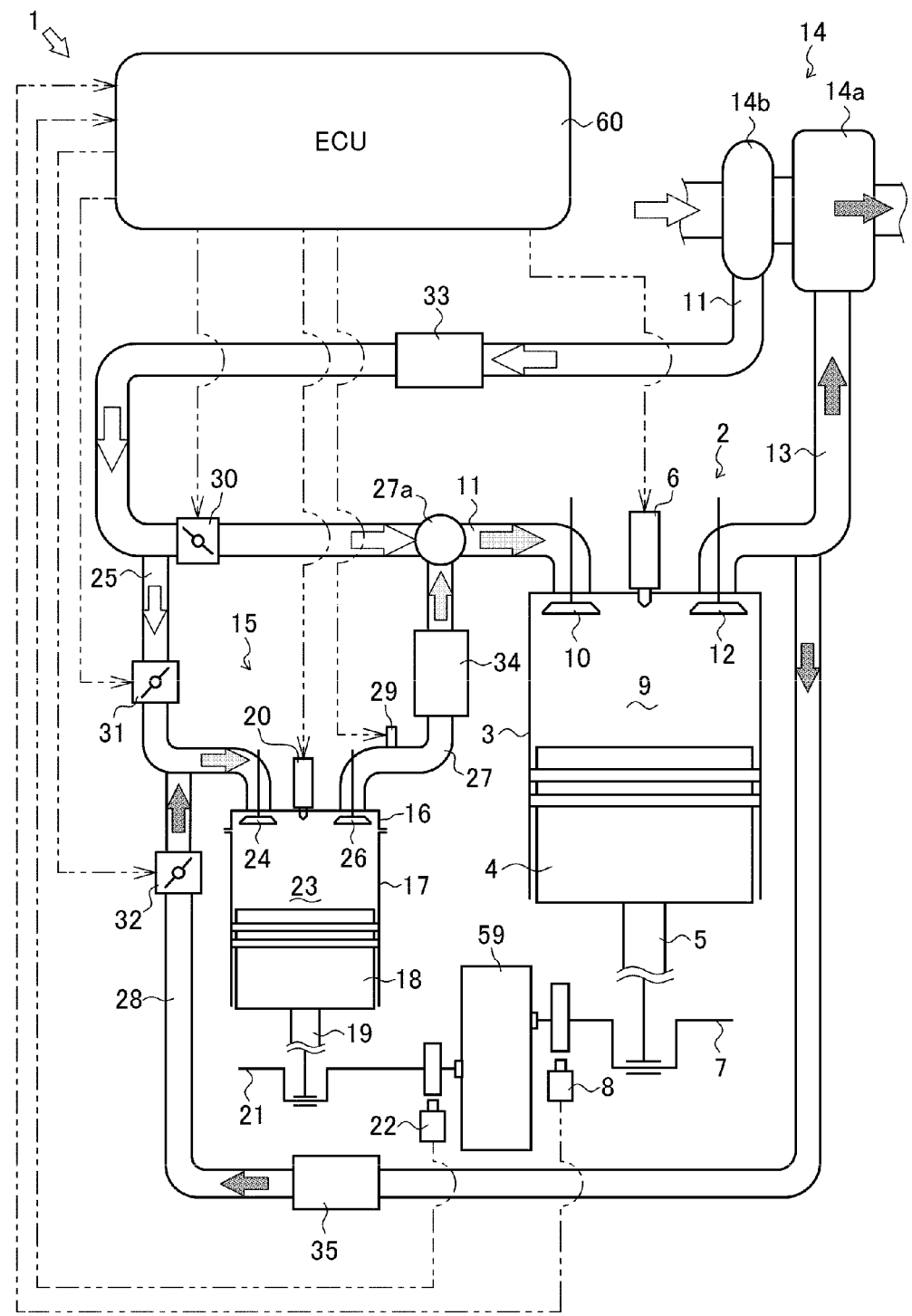
FIG. 2 is a schematic view illustrating a configuration of an outputting cylinder and a reforming cylinder in one embodiment of the engine according to the present invention.

As illustrated in FIG. 1 and FIG. 2, the engine 1 is a four-cylinder diesel engine using light oil or heavy oil as a fuel. The engine 1 mainly includes: four outputting cylinders 2; a supercharger 14; three reforming cylinders 15 serving as a fuel reforming device; an intake air intercooler 33; a reformed fuel intercooler 34; an EGR gas intercooler 35; a variable valve device 36 (see FIG. 3); and an ECU 60 as a control device. The engine 1 according to the present embodiment is a four-cylinder diesel engine. However, this should not be construed in a limiting sense.

As illustrated in FIG. 2, the outputting cylinders 2 generate driving force through combustion of fuel, and transmit the driving force to an output shaft. The outputting cylinders 2 include four cylinders. Each of the outputting cylinders 2 includes an output cylinder 3, an outputting piston 4, an outputting connecting rod 5, and a secondary fuel injection device 6.

The outputting cylinders 2 have the outputting piston 4 incorporated in the output cylinder 3 in a slidable manner. The output cylinder 3 has one side closed by an unillustrated cylinder head, and the other side open. The outputting piston 4 is coupled with an outputting crankshaft 7, serving as the output shaft, via the outputting connecting rod 5. The outputting cylinders 2 have a compression rate of 13 or more (for example, about 13 to 18), to prevent preignition or misfire from occurring.

The outputting crankshaft 7 is provided with an outputting crank angle detection sensor 8. The outputting cylinders 2 each include a combustion chamber 9 defined by an inner wall of the output cylinder 3 and an end surface of the outputting piston 4. The outputting cylinders 2 are each provided with the secondary fuel injection device 6 that can inject fuel into the combustion chamber 9. The secondary fuel injection device 6 includes an injector with a hole-type nozzle. The outputting cylinders 2 are coupled with an intake pipe 11 via an outputting intake valve 10 and to an exhaust pipe 13 via an outputting exhaust valve 12. In the present embodiment, the number of outputting cylinders 2 may be one or more than one.

As illustrated in FIG. 1 and FIG. 2, the supercharger 14 performs adiabatic compression on outer air, and supplies the resultant air to the combustion chamber 9 of the outputting cylinder 2. The supercharger 14 includes a turbine 14a and a compressor 14b. The turbine 14a is coupled with the exhaust pipe 13 and thus can be supplied with exhaust air from the combustion chamber 9. The compressor 14b is coupled with the intake pipe 11, and can suck outer air, as intake air, and supply the intake air into the combustion chamber 9. Thus, the supercharger 14 can achieve the adiabatic compression with the turbine 14a converting pressure of the exhaust air into rotational driving force to be transmitted to the compressor 14b and the compressor 14b sucking the outer air.

The reforming cylinders 15, serving as the fuel reforming device, reform a higher hydrocarbon fuel, such as light oil, into a lower hydrocarbon fuel (for example, methane), to prevent preignition. The reforming cylinders 15, serving as the fuel reforming device, include three cylinders (see FIG. 1). The reforming cylinders 15 perform the reforming of the fuel by performing the adiabatic compression on a result of injecting fuel onto a mixture (hereinafter simply referred to as "supply air") of the intake air and the exhaust air (EGR gas). The reforming cylinders 15 each include a reforming cylinder head 16, a reforming cylinder 17, a reforming piston 18, a reforming connecting rod 19, a main fuel injection device 20, and the like.

As illustrated in FIG. 2, the reforming cylinder 17 of the reforming cylinder 15 has one side closed by the reforming cylinder head 16, and incorporates the reforming piston 18 provided in a slidable manner. The reforming piston 18 is coupled with a reforming crankshaft 21 via the reforming connecting rod 19. The reforming crankshaft 21 is provided with a reforming crank angle detection sensor 22. The reforming piston 18 of the reforming cylinder 15 is coupled with the outputting crankshaft 7, via a reforming cylinder speed change device 59 described later, in an interlocking manner. The reforming piston 18 can move back and forth with the driving force transmitted from the outputting crankshaft 7 to the reforming crankshaft 21. In the present embodiment, the driving force is transmitted from the outputting crankshaft 7 to the reforming cylinders 15. However, this should not be construed in a limiting sense. The driving force may be transmitted from an independent driving source. The reforming cylinder 15 may be provided for each outputting cylinder 2, or one reforming cylinder 15 may be provided for a plurality of outputting cylinders 2. Furthermore, a cylinder serving as both the outputting cylinder 2 and the reforming cylinder 15 may be used.

The reforming cylinder 15 includes a reaction chamber 23 defined by the reforming cylinder head 16, the reforming cylinder 17, and an end surface of the reforming piston 18. The reaction chamber 23 has a volume changeable in accordance with the back and forth movement of the reforming piston 18. The reaction chamber 23 performs the adiabatic compression on the supply air and the fuel, in accordance with the volume change. The compression rate of the reaction chamber 23 is set to be 15 or more (for example, about 15 to 20). The volume of the reaction chamber 23 (the amount of exhaust air from the reforming cylinder 15) is set to be smaller than the amount of exhaust air from one of the outputting cylinders 2.

The main fuel injection device 20 supplies fuel into the reaction chamber 23. The main fuel injection device 20 is provided to the reforming cylinder head 16. The main fuel injection device 20 can supply an appropriate amount of fuel into the reaction chamber 23 at an appropriate timing. The main fuel injection device 20 includes a nozzle such as a pintle nozzle, a swirl injector, and an air-assist injector.

Each of the reforming cylinders 15 is coupled with a supply pipe 25 via a reforming intake valve 24. The intake air can be partially supplied to the supply pipe 25 through the intake pipe 11. The supply pipe 25 is coupled with the exhaust pipe 13 via an EGR pipe 28. Thus, the exhaust air from the combustion chamber 9 of the outputting cylinders 2 can be partially supplied to the supply pipe 25 as the EGR gas through the EGR pipe 28. Thus, the mixture (hereinafter, simply referred to as "supply air") of the intake air and the EGR gas can be supplied from the supply pipe 25 to the reaction chamber 23 of each of the reforming cylinders 15.

Each of the reforming cylinders 15 is coupled with an exhaust pipe 27 via a reforming exhaust valve 26. The exhaust pipe 27 is coupled with the intake pipe 11, which is more on the downstream side than the supply pipe 25, via a mixer 27a. Each of the reforming cylinders 15 can discharge the lower hydrocarbon fuel (hereinafter simply referred to as "reformed fuel"), as a result of the reforming, from the reaction chamber 23 to the intake pipe 11 via the exhaust pipe 27. The exhaust pipe 27 is provided with a reformed fuel temperature sensor 29 that is more on the upstream side of the reformed fuel intercooler 34 described later. The reformed fuel temperature sensor 29 detects the temperature of the reformed fuel immediately after being discharged from the reforming cylinders 15. In the present embodiment, the fuel reforming device includes the three reforming cylinders 15. However, this should not be construed in a limiting sense. The fuel reforming device may include one or a plurality of reforming cylinders 15.

The intake pipe 11 is provided with a first intake regulating valve 30 that is more on the downstream side than a coupled position of the supply pipe 25, and is more on the upstream side than a coupled position of the exhaust pipe 27. The first intake regulating valve 30 changes an outputting intake air flow amount A1. The first intake regulating valve 30 includes an electromagnetic flow amount control valve.

The first intake regulating valve 30 can change the opening of the first intake regulating valve 30, based on a signal acquired from the ECU 60 as the control device described below. The first intake regulating valve 30, which is the electromagnetic flow amount control valve in the present embodiment, may be any valve as long as the outputting intake air flow amount A1 can be changed.

The supply pipe 25 is provided with a second intake regulating valve 31 that is more on the upstream side than a coupled position of the EGR pipe 28. The second intake regulating valve 31 changes a reforming intake air flow amount A2. The second intake regulating valve 31 includes an electromagnetic flow amount control valve. The second intake regulating valve 31 can change the opening of the second intake regulating valve 31, based on a signal acquired from the ECU 60 described below. The second intake regulating valve 31, which is the electromagnetic flow amount control valve in the present embodiment, may be any valve as long as the reforming intake air flow amount A2 can be changed.

The EGR pipe 28 is provided with an EGR gas regulating valve 32. The EGR gas regulating valve 32 changes an EGR gas flow amount A3. The EGR gas regulating valve 32 includes an electromagnetic flow amount control valve. The EGR gas regulating valve 32 can change the opening of the EGR gas regulating valve 32, based on a signal acquired from the ECU 60 described below. The EGR gas regulating valve 32, which is the electromagnetic flow amount control valve in the present embodiment, may be any valve as long as the EGR gas flow amount A3 can be changed.

In the engine 1 with this configuration, a mixture ratio between the intake air and the reformed fuel discharged from the reaction chamber 23 of each of the reforming cylinders 15 can be changed with the first intake regulating valve 30. Furthermore, in the engine 1, a mixture ratio between the intake air and the EGR gas supplied to the reaction chamber 23 can be changed with the second intake regulating valve 31 and the EGR gas regulating valve 32.

The intake air intercooler 33, the reformed fuel intercooler 34, and the EGR gas intercooler 35 cool gas. The intake air intercooler 33 is provided to the intake pipe 11. The intake air intercooler 33 can cool the intake air after the adiabatic compression by the compressor 14b. The reformed fuel intercooler 34 is provided to the exhaust pipe 27. The reformed fuel intercooler 34 can cool the reformed fuel discharged from the reaction chamber 23 of each of the reforming cylinders 15. The reformed fuel intercooler 34 includes a heat radiator or a heat exchanger that uses air or water as a cooling medium. The EGR gas intercooler 35 is provided to the EGR pipe 28. The EGR gas intercooler 35 can cool the exhaust air heated by the combustion of the fuel.

Figure 3:
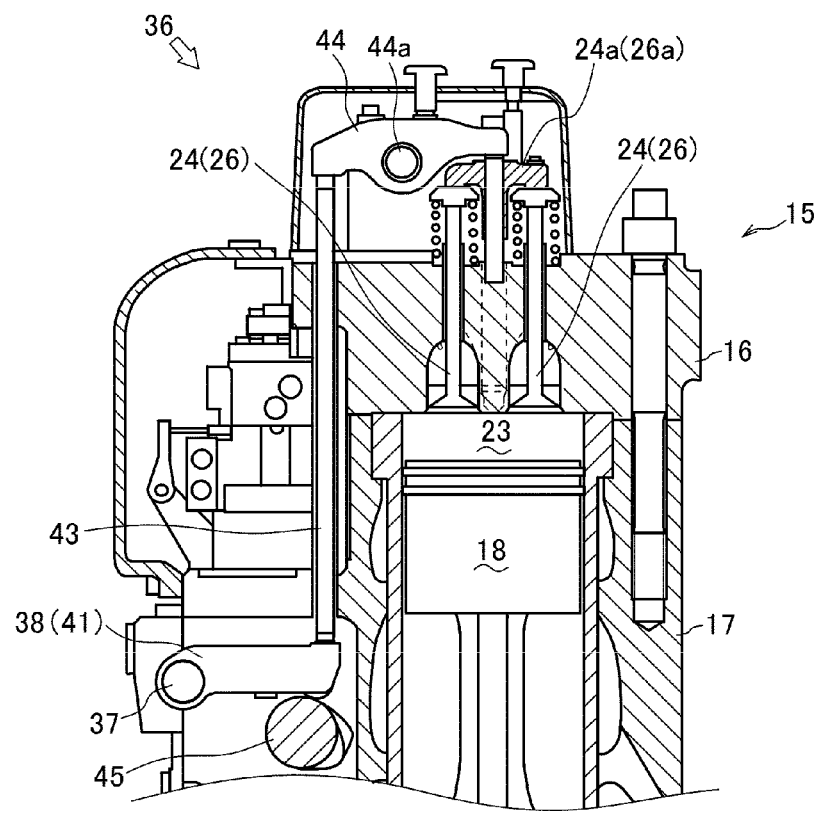
FIG. 3 is a side sectional view illustrating a variable valve device in one embodiment of the engine according to the present invention.
Figure 4:
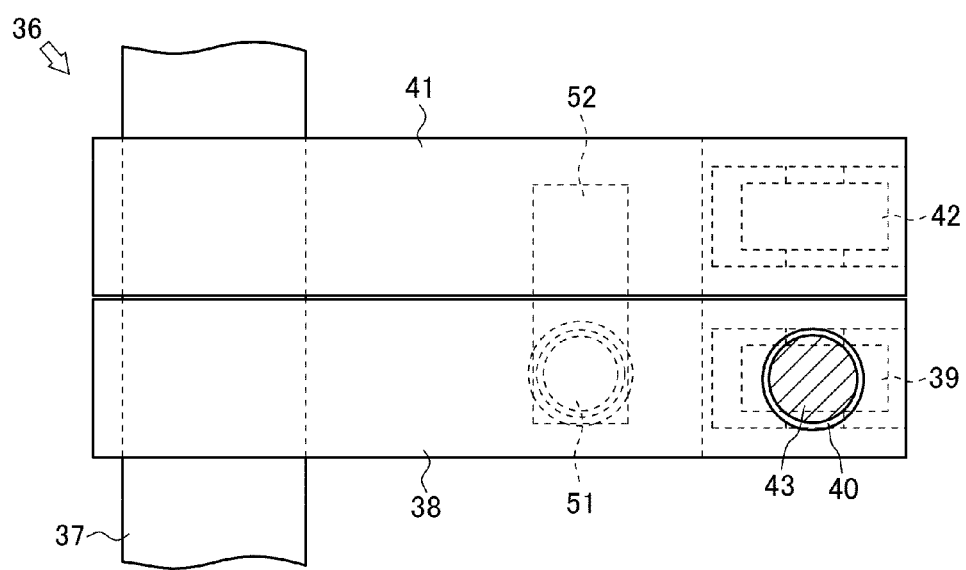
FIG. 4 is a partially enlarged plan view of the variable valve device in one embodiment of the engine according to the present invention.
Figure 5:
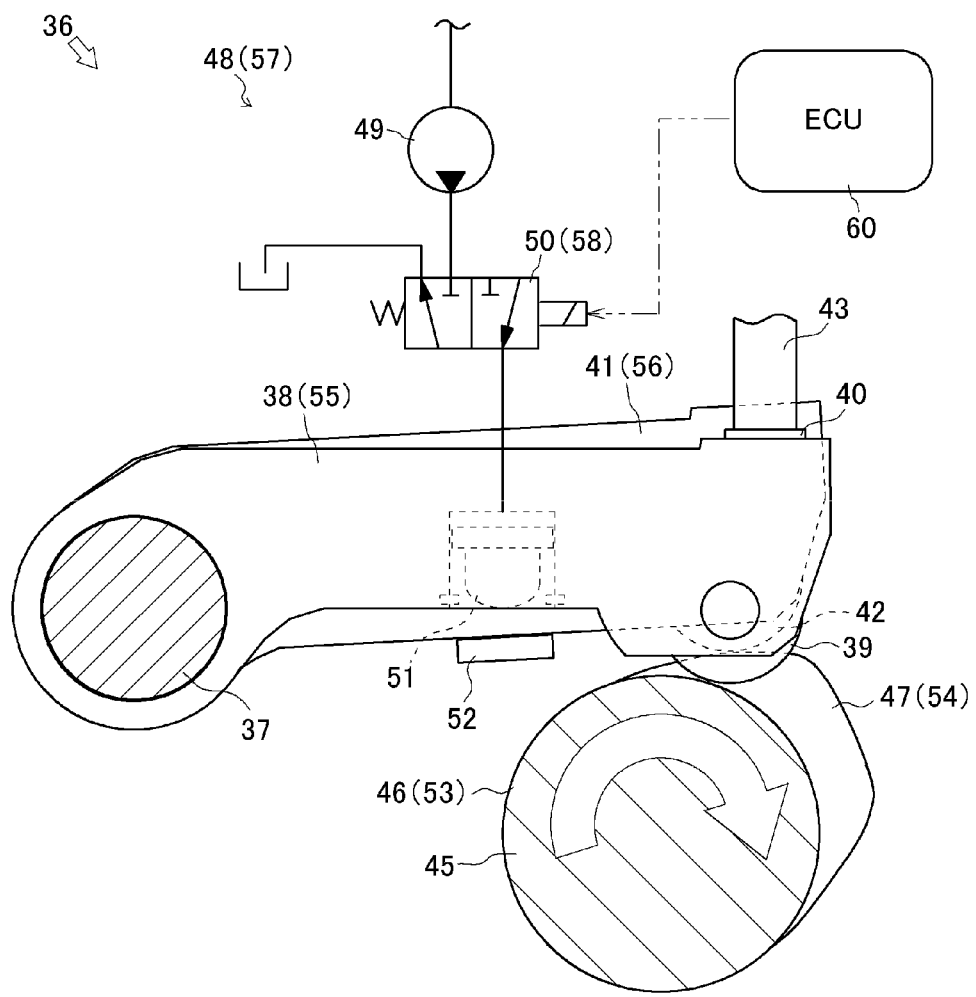
FIG. 5 is a partially enlarged plan view illustrating a case where a hydraulic cylinder in the variable valve device in one embodiment of the engine according to the present invention is not protrudent.

As illustrated in FIG. 3 to FIG. 5, the variable valve device 36 opens and closes the reforming intake valve 24 and the reforming exhaust valve 26 at predetermined timings. The variable valve device 36 includes a mechanism for opening and closing the reforming intake valve 24. The mechanism includes a swing arm shaft 37, a first swing arm 38, a second swing arm 41, a push rod 43, a valve arm 44, a cam shaft 45, an intake air switching unit 48 (see FIG. 5), and the like, and is driven in accordance with a rotational movement of the reforming crankshaft 21 to open and close the reforming intake valve 24. The variable valve device 36 includes a mechanism for opening and closing the reforming exhaust valve 26. The mechanism includes a third swing arm 55, a fourth swing arm 56, an exhaust air switching unit 57 (see FIG. 5), and the like, and is driven in accordance with a rotational movement of the reforming crankshaft 21 to open and close the reforming exhaust valve 26. The third swing arm 55, the fourth swing arm 56, the exhaust air switching unit 57, and the like have the same configurations as the first swing arm 38, the second swing arm 41, the intake air switching unit 48, and the like, and thus will not be described in detail.

As illustrated in FIG. 4 and FIG. 5, the swing arm shaft 37 extends in parallel with an axial direction (hereinafter, a description is given with the axial direction of the reforming crankshaft 21 defined as "front and rear direction") of the reforming crankshaft 21.

The first swing arm 38 is a substantially rectangular parallelepiped member. The first swing arm 38 has one end in the longitudinal direction swingably supported by the swing arm shaft 37. The first swing arm 38 has a lower portion of the other end in the longitudinal direction rotatably supporting the first cam roller 39. The other end of the first swing arm 38 has an upper surface on which a rod support member 40, having a semispherical recess facing upward, is attached.

The second swing arm 41 is a substantially rectangular parallelepiped member. The second swing arm 41 has one end in the longitudinal direction disposed adjacent to the first swing arm 38 and swingably supported by the swing arm shaft 37. Thus, the second swing arm 41 is swingably supported by the swing arm shaft 37 while being disposed adjacent to the first swing arm 38. The second swing arm 41 has a lower portion of the other end in the longitudinal direction rotatably supporting a second cam roller 42.

As illustrated in FIG. 3, the push rod 43 is a substantially columnar member with which the first swing arm 38 and the valve arm 44 are coupled with each other in an interlocking manner. The push rod 43 has a semispherical lower end that is swingably fit in the recess of the rod support member 40 of the first swing arm 38. The push rod 43 has an upper end swingably fit in the one end of the valve arm 44.

The valve arm 44, with which the push rod 43 and an intake air coupling member 24a are coupled with each other, is swingably supported by a valve arm shaft 44a extending in the front and rear direction. The valve arm 44 has one end coupled with the upper end of the push rod 43, and the other end coupled with the intake air coupling member 24a.

As illustrated in FIG. 3 and FIG. 5, the cam shaft 45 is disposed below the other end of first swing arm 38 and the second swing arm 41 in the longitudinal direction, while extending in the front and rear direction. The cam shaft 45 is coupled with the reforming crankshaft 21 via a gear and the like in an interlocking manner, and rotates when the reforming crankshaft 21 rotates. The cam shaft 45 includes a first cam 46 and a second cam 47 that are formed while being apart from each other in the axial direction (front and rear direction) by a predetermined distance. The first cam 46 and the second cam 47 have different profiles. The first cam 46 is disposed on the cam shaft 45 in such a manner as to be in contact with the first cam roller 39 of the first swing arm 38 from below. The second cam 47 is disposed on the cam shaft 45 in such a manner as to be in contact with the second cam roller 42 of the second swing arm 41 from below.

The cam shaft 45 further includes a third cam 53 and a fourth cam 54, for the reforming exhaust valve 26, formed thereon. The third cam 53 and the fourth cam 54 have different profiles. The third swing arm 55 and the fourth swing arm 56, for the reforming exhaust valve 26, are coupled with an exhaust air coupling member disposed on an upper end of the reforming exhaust valve 26 via the push rod 43 and the valve arm 44.

When the first swing arm 38 swings to a side opposite to the cam shaft 45, the reforming intake valve 24 opens via the push rod 43 fit in the rod support member 40 of the first swing arm 38, the valve arm 44, and the intake air coupling member 24a (see FIG. 3). Similarly, when the third swing arm 55 for the reforming exhaust valve 26 swings to the side opposite to the cam shaft 45, the reforming exhaust valve 26 opens via the push rod 43 fit in the rod support member of the third swing arm 55 and the valve arm 44 (see FIG. 3).

As illustrated in FIG. 5, the intake air switching unit 48 switches an operation state of the first swing arm 38 and the second swing arm 41, and switches opening and closing timings of the reforming intake valve 24. The intake air switching unit 48 includes a hydraulic pump 49, an electromagnetic intake-valve switching valve 50, a hydraulic piston 51, and a receiving member 52, and further includes oil paths formed by these members, the swing arm shaft 37, and the first swing arm 38.

The electromagnetic intake-valve switching valve 50 switches a flow path of hydraulic oil supplied to the hydraulic piston 51, upon receiving a control signal. The hydraulic oil pumped by the hydraulic pump 49 is supplied to the hydraulic piston 51 of the first swing arm 38 via the electromagnetic intake-valve switching valve 50.

The hydraulic piston 51 is a hydraulic actuator disposed on the first swing arm 38. The hydraulic piston 51 has a semispherical bottom portion that is movable toward the cam shaft 45. The bottom portion of the hydraulic piston 51 protrudes toward the cam shaft 45, in accordance with the switching of the flow path of the hydraulic oil by the electromagnetic intake-valve switching valve 50.

As illustrated in FIG. 4 and FIG. 5, the receiving member 52 is a plate-shaped member attached to a side surface of the second swing arm 41 on a side of the cam shaft 45. The receiving member 52 extends to a side surface of the first swing arm 38 on a side of the cam shaft 45 from the second swing arm 41. The receiving member 52 has an extending end portion that faces and overlaps with the hydraulic piston 51 of the first swing arm 38 in bottom view. The receiving member 52 does not come into contact with the first swing arm within a movable range of the second swing arm 41. When the bottom portion of the hydraulic piston 51 protrudes, a bottom portion of the receiving member 52 comes into contact with the bottom portion.

Similarly, as illustrated in FIG. 5, the exhaust air switching unit 57 switches an operation state of the third swing arm 55 and the fourth swing arm 56, and switches opening and closing timings of the reforming exhaust valve 26. The exhaust air switching unit 57 includes the hydraulic pump 49, an electromagnetic exhaust-valve switching valve 58, the hydraulic piston 51, and the receiving member 52, and further includes oil paths formed by these members, the swing arm shaft 37, and the third swing arm 55.

The electromagnetic exhaust-valve switching valve 58 switches the flow path of the hydraulic oil supplied to the hydraulic piston 51, upon receiving a control signal. The hydraulic oil pumped by the hydraulic pump 49 is supplied to the hydraulic piston 51 of the third swing arm 55 via the electromagnetic exhaust-valve switching valve 58.

As illustrated in FIG. 2, the reforming cylinder speed change device 59 changes reforming cylinder rotational speed Nr. The reforming cylinder speed change device 59 has an input side coupled with the outputting crankshaft 7 and an output side coupled with the reforming crankshaft 21. The reforming cylinder speed change device 59 transmits the driving force, from the outputting crankshaft 7 rotating at target rotational speed Np of the engine 1, to the reforming crankshaft 21 at appropriate reforming cylinder rotational speed Nr. Thus, the reforming cylinder speed change device 59 can rotate the reforming cylinders 15 at the appropriate reforming cylinder rotational speed Nr, while the outputting cylinders 2 are rotating at the target rotational speed Np. The reforming cylinder speed change device 59 may be a gear-type stepped speed change device, a belt-type or hydraulic stepless speed change device, or the like with which the rotational speed on the output side can be appropriately changed from that on the input side.

As illustrated in FIG. 2, the ECU 60 as the control device controls the engine 1. Specifically, the ECU 60 controls the secondary fuel injection device 6, the main fuel injection device 20, the first intake regulating valve 30, the second intake regulating valve 31, the EGR gas regulating valve 32, the electromagnetic intake-valve switching valve 50, the electromagnetic exhaust-valve switching valve 58, and the like. The ECU 60 stores therein various programs and data for controlling the engine 1. The ECU 60 may be connected to a CPU, a ROM, a RAM, an HDD, and the like via a bus, or may be a one-chip LSI or the like.

Figure 6:
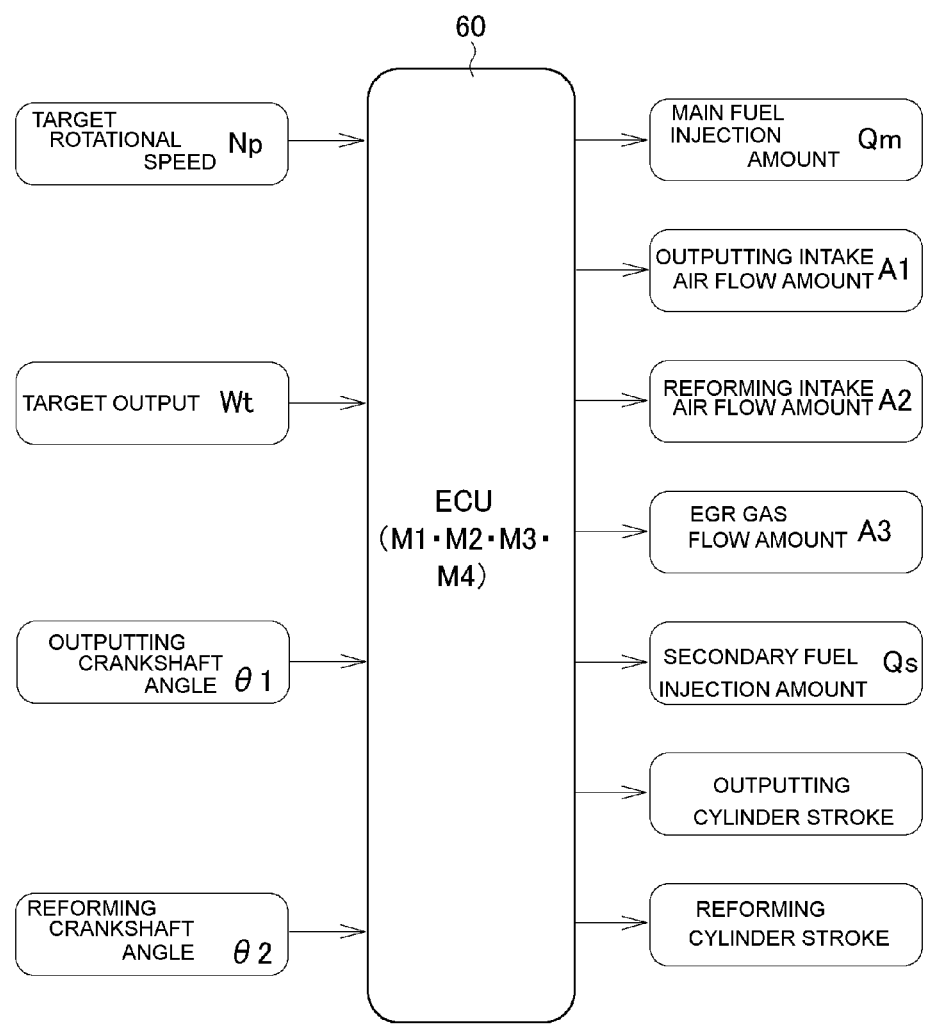
FIG. 6 is a schematic view of a control configuration in one embodiment of the engine according to the present invention.

As illustrated in FIG. 6, the ECU 60 stores therein various programs for controlling fuel injection; a main fuel injection amount map M1 for calculating a main fuel injection amount Qm based on a target rotational speed Np and target output Wt of the engine 1; an intake air flow amount map M2 for calculating an outputting intake air flow amount A1 supplied to the combustion chamber 9 of the outputting cylinder 2, based on the target rotational speed Np and the main fuel injection amount Qm; a mixture flow amount map M3 for calculating a reforming intake air flow amount A2 and an EGR gas flow amount A3 supplied to the reaction chamber 23 of the reforming cylinder 15 based on the target rotational speed Np and the main fuel injection amount Qm; a secondary fuel injection amount map M4 for calculating a secondary fuel injection amount Qs for ignition that is injected into the combustion chamber 9 based on the target rotational speed Np and the main fuel injection amount Qm; and the like.

As illustrated in FIG. 2, the ECU 60 is coupled with the secondary fuel injection device 6, and can control fuel injection of the secondary fuel injection device 6.

The ECU 60 is coupled with the main fuel injection device 20, and can control fuel injection of the main fuel injection device 20.

The ECU 60 is coupled with the reformed fuel temperature sensor 29, and can acquire the temperature of the reformed fuel detected by the reformed fuel temperature sensor 29.

The ECU 60 is coupled with the first intake regulating valve 30, and can control opening/closing of the first intake regulating valve 30.

The ECU 60 is coupled with the second intake regulating valve 31, and can control opening/closing of the second intake regulating valve 31.

The ECU 60 is coupled with the EGR gas regulating valve 32, and can control opening/closing of the EGR gas regulating valve 32.

The ECU 60 is coupled with the outputting crank angle detection sensor 8, and can acquire an outputting crankshaft angle θ1 detected by the outputting crank angle detection sensor 8.

The ECU 60 is coupled with the reforming crank angle detection sensor 22, and can acquire a reforming crankshaft angle θ2 detected by the reforming crank angle detection sensor 22.

As illustrated in FIG. 5, the ECU 60 is coupled with the electromagnetic intake-valve switching valve 50, and can control the electromagnetic intake-valve switching valve 50.

The ECU 60 is coupled with the electromagnetic exhaust-valve switching valve 58, and can control the electromagnetic exhaust-valve switching valve 58.

The ECU 60 is coupled with the reforming cylinder speed change device 59 (see FIG. 2), and can control the reforming cylinder speed change device 59.

The ECU 60 is coupled with an unillustrated cooling water temperature sensor, and can acquire the temperature of cooling water detected by the cooling water temperature sensor.

An operation mode of the components of the engine 1 according to one embodiment of the present invention is described below.

First of all, paths of intake air and exhaust air in the engine 1 are described.

As illustrated in FIG. 2, the outer air sucked in by the compressor 14b of the supercharger 14 is discharged to the intake pipe 11 as intake air in an adiabatically compressed state. The intake air is cooled by the intake air intercooler 33, and then is supplied to the combustion chamber 9 of the outputting cylinder 2 through the intake pipe 11. The intake air is partially supplied to the reaction chamber 23 of the reforming cylinder 15 via the supply pipe 25 coupled with the intake pipe 11 and the reforming intake valve 24.

The exhaust air from the combustion chamber 9 of the outputting cylinder 2 rotates the turbine 14a of the supercharger 14 through the exhaust pipe 13, and then is discharged outside. The exhaust air is partially supplied to the reaction chamber 23 of the reforming cylinder 15 as the EGR gas, through the EGR pipe 28 and the supply pipe 25 coupled with the EGR pipe 28.

The supply air (the intake air and the EGR gas) supplied to the reaction chamber 23 is adiabatically compressed by the reforming piston 18 in the reaction chamber 23 together with the injected fuel. The supply air and the reformed fuel are adiabatically expanded in accordance with the movement of the reforming piston 18. Then, the supply air and the reformed fuel are discharged from the reaction chamber 23 due to the compression caused by the movement of the reforming piston 18, and then is recirculated to the intake pipe 11, via the reforming exhaust valve 26 and through the exhaust pipe 27, to be supplied to the combustion chamber 9.

Next, how the ECU 60 calculates various predetermined amounts is described. As illustrated in FIG. 6, the ECU 60 calculates the main fuel injection amount Qm from the main fuel injection amount map M1, based on the target rotational speed Np and target output Wt of the engine 1 determined in accordance with an operation amount on an unillustrated operation device and the like.

The ECU 60 calculates an outputting intake air flow amount A1 for supplying to the combustion chamber 9 of the outputting cylinder 2, from the intake air flow amount map M2, based on the target rotational speed Np and the main fuel injection amount Qm.

The ECU 60 calculates the reforming intake air flow amount A2 and the EGR gas flow amount A3 supplied to the reaction chamber 23 of the reforming cylinder 15, from the mixture flow amount map M3 based on the target rotational speed Np and the main fuel injection amount Qm.

The ECU 60 calculates the secondary fuel injection amount Qs of the igniting fuel supplied to the combustion chamber 9 of the outputting cylinder 2, from the secondary fuel injection amount map M4, based on the target rotational speed Np and the main fuel injection amount Qm.

The ECU 60 acquires the outputting crankshaft angle θ1 detected by the outputting crank angle detection sensor 8 and the reforming crankshaft angle θ2 detected by the reforming crank angle detection sensor 22, and calculates strokes of the outputting cylinders 2 and the reforming cylinders 15.

Next, an operation mode of the variable valve device 36 with the configuration described above is described. The operation mode of the variable valve device 36 for the intake valve 24 is the same as the operation mode of the variable valve device 36 for the exhaust valve 26. Thus, a detailed description on the operation mode of the variable valve device 36 for the exhaust valve 26 is omitted.

Figure 7A:
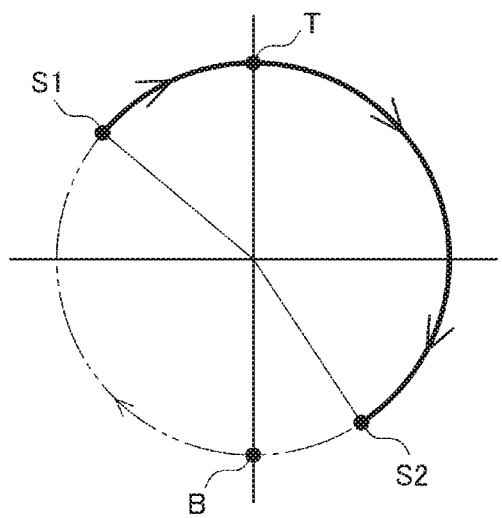
FIG. 7($a$) is a diagram illustrating a relationship between a crank angle of one cam and opening and closing timings of an intake valve in one embodiment of the engine according to the present invention, and FIG. 7($b$) is a diagram illustrating a relationship between the crank angle and a valve lift of the intake valve.
Figure 7B:
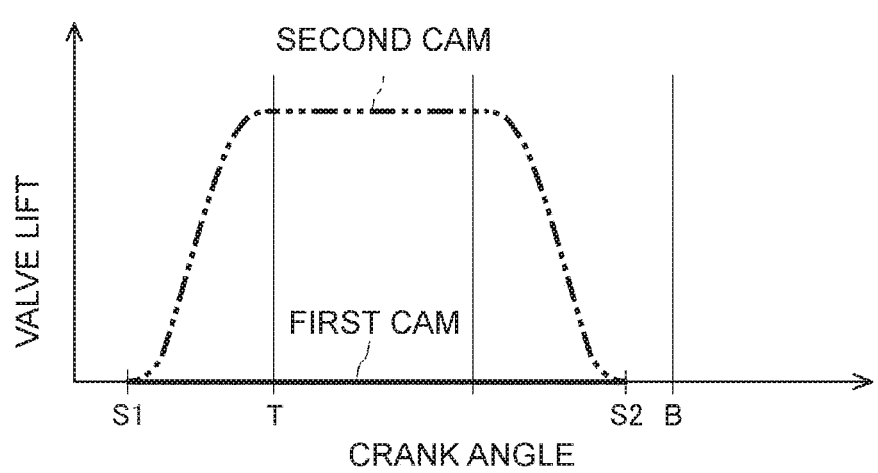

As illustrated in FIG. 7(*a*) and FIG. 7(*b*), the first cam 46 (see FIG. 5) has a cam profile that maintains a state where the first swing arm 38 has been swung to be closest to the cam shaft 45 during all the strokes of the reforming cylinders 15 in a single cycle. More specifically, the first cam 46 has a cam profile that maintains a state where the reforming intake valve 24 is closed during all the strokes of the reforming cylinders 15 in a single cycle. The second cam 47 (see FIG. 5) has a cam profile that causes the second swing arm 41 to swing in accordance with the stroke of the outputting cylinders 2. Specifically, the second cam 47 has a profile designed in such a manner that the reforming intake valve 24 starts to open at a timing (S1) earlier than a top dead point (hereinafter, referred to as an "intake air top dead point") T of the intake stroke of the reforming piston 18, and that the maximum valve lift of the reforming intake valve 24 is achieved at the intake air top dead point T of the reforming piston 18. Thus, the second cam 47 has the cam profile that causes the reforming intake valve 24 to open and close in accordance with the stroke of the outputting cylinders 2.

As illustrated in FIG. 5, when the ECU 60 is controlling the electromagnetic intake-valve switching valve 50 of the variable valve device 36 in such a manner that the bottom portion of the hydraulic piston 51 does not protrude toward the cam shaft 45, the first swing arm 38 swings about the swing arm shaft 37 in accordance with the profile of the first cam 46. The second swing arm 41 swings about the swing arm shaft 37 in accordance with the profile of the second cam 47.

When the first cam 46 and the second cam 47 further rotate in a direction indicated by a white arrow, the first swing arm 38 stays in the state of having been swung to be closest to the cam shaft 45 in accordance with the profile of the first cam 46. The second swing arm 41 swings to a side opposite to the cam shaft 45 in accordance with the profile of the second cam 47. In this process, the receiving member 52 of the second swing arm 41 that has been swung to the side opposite to the cam shaft 45 enters a recess formed on the side surface of the first swing arm 38 on the side of the cam shaft 45. Thus, the first swing arm 38 stays in the state of having been swung to be closest to the cam shaft 45 without coming into contact with the receiving member 52. In other words, the reforming intake valve 24 of the reforming piston 18 stays in a closed state. Thus, the opening and closing timings of the reforming intake valve 24 are determined in accordance with the operation of the first swing arm 38, and not in accordance with the operation of the second swing arm 41.

The first swing arm 38 enters a state of being supported by the second swing arm 41, when the hydraulic piston 51 comes into contact with the receiving member 52 of the second swing arm 41. Thus, when the first cam 46 and the second cam 47 further rotate in the direction indicated by the white arrow, the first swing arm 38 swings in accordance with the second swing arm 41 to which the receiving member 52 is attached, and not in accordance with the profile of the first cam 46. Thus, when the second swing arm 41 swings toward the cam shaft 45 in accordance with the profile of the second cam 47, the first swing arm 38 also swings toward the cam shaft 45. Thus, the reforming intake valve 24 of the reforming piston 18 is closed in accordance with the profile of the second cam 47. When the first swing arm 38 swings to the side opposite to the cam shaft 45, the reforming intake valve 24 opens in accordance with the profile of the second cam 47 (see FIG. 2). All things considered, the opening and closing timings of the reforming intake valve 24 are determined in accordance with the operation of the second swing arm 41.

The ECU 60 can change the opening and closing timings of the reforming exhaust valve 26 by switching the electromagnetic exhaust-valve switching valve 58 of the variable valve device 36, as in the operation mode of switching the opening and closing timings of the reforming intake valve 24 with the variable valve device 36. The third cam 53 that makes the third swing arm 55 swing has a cam profile for maintaining the state where the reforming exhaust valve 26 is closed.

As illustrated in FIG. 5, when the ECU 60 controls the electromagnetic exhaust-valve switching valve 58 of the variable valve device 36 in such a manner that the bottom portion of the hydraulic piston 51 of the third swing arm 55 does not protrude toward the cam shaft 45, the third swing arm 55 and the fourth swing arm 56 swing independently from each other. More specifically, the third swing arm 55 stays in a state of having been swung to be closest to the cam shaft 45 in accordance with the profile of the third cam 53. The fourth swing arm 56 swings in accordance with the profile of the fourth cam 54. Thus, the opening and closing timings of the reforming exhaust valve 26 are determined in accordance with the operation of the third swing arm 55, and not in accordance with the operation of the fourth swing arm 56.

When the ECU 60 controls the electromagnetic exhaust-valve switching valve 58 of the variable valve device 36 in such a manner that the bottom portion of the hydraulic piston 51 of the third swing arm 55 protrudes toward the cam shaft 45, the third swing arm 55 enters a state of being supported by the fourth swing arm 56, with the hydraulic piston 51 being in contact with the receiving member 52 of the fourth swing arm 56. Thus, the third swing arm 55 swings in accordance with the swinging of the fourth swing arm 56 to which the receiving member 52 is attached, and not in accordance with the profile of the third cam 53. Thus, the opening and closing timings of the reforming exhaust valve 26 are determined in accordance with the operation of the fourth swing arm 56, and not in accordance with the operation of the third swing arm 55. In the present embodiment, the compression rate and the expansion rate are controlled through cam switching by the hydraulic piston 51. However, this should not be construed in a limiting sense. Any mechanism, for example, an overhead variable valve mechanism or the like, capable of changing the compression rate and the expansion rate may be employed.

Next, how fuel is reformed with the reforming cylinders 15 will be described with reference to FIG. 8.

Figure 8:
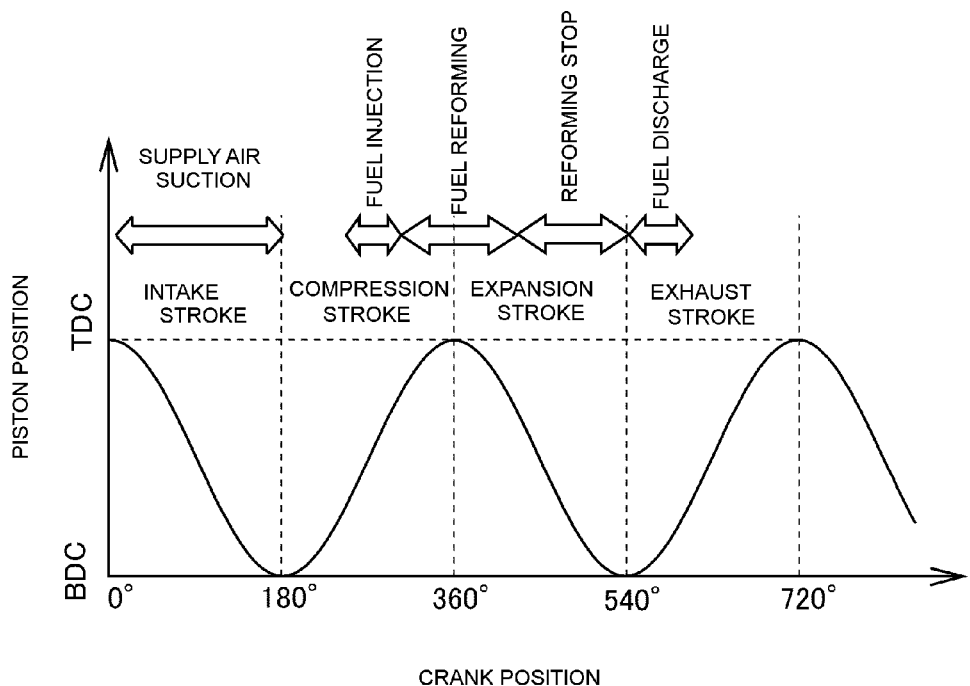
FIG. 8 is a chart representing a state in a reaction chamber at a crank position of a reforming cylinder in one embodiment of the engine according to the present invention.

As illustrated in FIG. 8, when the reforming cylinder 15 is in the intake stroke, the reforming piston 18 moves from the top dead point to the bottom dead point. Thus, the internal pressure of the reaction chamber 23 of the reforming cylinders 15 drops due to the volume increase caused by the movement of the reforming piston 18. When the reforming cylinder 15 is in the intake stroke, the reforming intake valve 24 opens for supplying the supply air and the exhaust air to the reaction chamber 23. The ECU 60 controls the opening and closing of the second intake regulating valve 31 based on the acquired reforming crankshaft angle θ2, in such a manner that the intake air is supplied into the reaction chamber 23 of the reforming cylinders 15 by the calculated reforming intake air flow amount A2, due to the drop in the internal pressure while the reforming cylinder 15 is in the intake stroke (for example, while the reforming piston 18 is close to the bottom dead point). Furthermore, the ECU 60 controls the opening and closing of the EGR gas regulating valve 32 in such a manner that the EGR gas is supplied into the reaction chamber 23 of the reforming cylinders 15 by the calculated EGR gas flow amount A3. Thus, the supply air at an oxygen concentration suitable for fuel reforming is supplied to the reaction chamber 23 (supply air suction in FIG. 8).

When the reforming cylinder 15 is in a compression stroke, the reforming piston 18 moves from the bottom dead point to the top dead point. Thus, the internal pressure of the reaction chamber 23 of the reforming cylinder 15 increases due to the volume decrease caused by the movement of the reforming piston 18. Thus, the supply air supplied to the reaction chamber 23 is adiabatically compressed by the reforming piston 18. When the supply air is adiabatically compressed, a high-temperature and high-pressure state is achieved in the reaction chamber 23 of the reforming cylinder 15.

When the reforming cylinder 15 is in the compression stroke, the ECU 60 controls the main fuel injection device 20 based on the acquired reforming crankshaft angle θ2, in such a manner that the fuel is supplied to the reaction chamber 23 of the reforming cylinder 15 by the calculated main fuel injection amount Qm. Thus, the fuel is injected into the reaction chamber 23 of the reforming cylinder 15 in the high-temperature and high-pressure state (fuel injection in FIG. 8). The fuel for achieving a fuel air equivalence ratio required for reforming to the lower hydrocarbon fuel by using the supply air supplied to the reaction chamber 23 is supplied to the reaction chamber 23.

The injected fuel in the reaction chamber 23 is dispersed and is quickly mixed (premixed) with the supply air in the reaction chamber 23 in the high-temperature and higher pressure state to be evaporated. The reforming reaction of the fuel premixed with the supply air starts when the reforming piston 18 reaches a portion close to the top dead point to achieve the highest-temperature and highest-pressure state in the reaction chamber 23.

When the reforming cylinder 15 is in an expansion stroke, the reforming piston 18 moves from the top dead point to the bottom dead point. Thus, the internal pressure of the reaction chamber 23 of the reforming cylinder 15 drops due to the volume increase caused by the movement of the reforming piston 18. The reformed fuel is adiabatically expanded due to the volume increase in the reaction chamber 23. Thus, the reformed fuel is cooled to be in a pressure drop state, whereby the reforming reaction stops (reforming stop in FIG. 8).

When the reforming cylinder 15 is in an exhaust stroke, the reforming piston 18 moves from the bottom dead point to the top dead point. Thus, the internal pressure of the reaction chamber 23 of the reforming cylinder 15 rises due to the volume decrease caused by the movement of the reforming piston 18. When the reforming cylinder 15 is in the exhaust stroke, the reforming exhaust valve 26 opens for discharging the reformed fuel from the reaction chamber 23. Thus, the reformed fuel is discharged from the reaction chamber 23 via the reforming exhaust valve 26, to be recirculated to the intake pipe 11 through the exhaust pipe 27 (fuel discharge in FIG. 8).

The reformed fuel is supplied as high temperature fuel gas to the exhaust pipe 27, due to residual heat, in the heat of the supply air, not used for endothermic decomposition reaction in the reforming. The high temperature reformed fuel supplied to the exhaust pipe 27 is cooled by the reformed fuel intercooler 34 of the exhaust pipe 27. Thus, self-preignition in the outputting cylinders 2 is prevented. The reformed fuel cooled by the reformed fuel intercooler 34 is supplied to the intake pipe 11 via the mixer 27a.

Next, control on a mass balance between the fuel supplied to the outputting cylinders 2 and the fuel reformed by the reforming cylinders 15 is described.

An amount Gf of reformed fuel, which is a total amount of reformed fuel supplied to the outputting cylinders 2 in a single cycle, is calculated based on the following Formula 1, from an output side fuel air equivalence ratio φp representing the fuel air equivalence ratio in the outputting cylinder 2, an output side intake air amount Gair, the number of outputting cylinders Kp, the target rotational speed Np of the outputting cylinder corresponding to the target rotational speed of the engine 1, and an output side theoretical mixture ratio αp.

$$Gf = \frac{\phi p \cdot Gair \cdot Kp \cdot \text{Np}}{2 \cdot \alpha p} \quad \text{[Formula 1]}$$

An amount gf of supplied fuel to one reforming cylinder 15 is calculated based on the following Formula 2, from a reformation side fuel air equivalence ratio φr representing the fuel air equivalence ratio in the reforming cylinder 15, an EGR rate ψegr, an amount gi of reformation side suctioned gas for each cylinder, and a reformation side theoretical mixture ratio αr.

$$gf = \frac{\phi r \cdot (1 - \psi egr) \cdot gi}{(\phi r \cdot \psi egr) + \alpha r} \quad \text{[Formula 2]}$$

An amount Gf of reformed fuel is also calculated based on the following Formula 3, from the amount gf of supplied fuel to the reforming cylinders 15, the number of reforming cylinders Kr supplied with the fuel and the supply air, and the reforming cylinder rotational speed Nr.

$$Gf = gf \cdot Kr \cdot \frac{Nr}{2} \quad \text{[Formula 3]}$$

The following Formula 4, obtained by applying Formulae 1 and 2 to Formula 3, represents the relationship between: the product of the number of reforming cylinders Kr supplied with the fuel and the supply air and the reforming cylinder rotational speed Nr; and the product of the number of outputting cylinders Kp and the outputting cylinder target rotational speed Np. Thus, the product of the rotational speed and the number of cylinders in the outputting cylinders 2 and in the reforming cylinders 15 represents the mass balance between the fuel supplied to the outputting cylinders 2 and the fuel reformed by the reforming cylinders 15.

$$Kr \cdot Nr = \frac{\phi p \cdot Gair \cdot (\phi r \cdot \psi egr + \alpha r)}{\phi r \cdot gi \cdot \alpha p(1 - \psi egr)} \cdot Kp \cdot Np \quad \text{[Formula 4]}$$

The ECU 60 calculates the output side fuel air equivalence ratio φp, the output side intake air amount Gair, and the output side theoretical mixture ratio αp, from: the main fuel injection amount Qm calculated from the main fuel injection amount map M1 based on the target rotational speed Np and the target output Wt of the engine 1 determined from an operation amount on an unillustrated operation tool or the like; the number of outputting cylinders Kp; and the opening of the first intake regulating valve 30 and the second intake regulating valve 31. Similarly, the ECU 60 calculates: the reformation side fuel air equivalence ratio φr; the EGR rate ψegr; and the amount gi of reformation side suctioned gas for each cylinder and the reformation side theoretical mixture ratio αr.

The ECU 60 sets the number of reforming cylinders Kr supplied with the fuel and the supply air to be the minimum number, and calculates the reforming cylinder rotational speed Nr based on Formula 4, from the output side fuel air equivalence ratio φp, the output side intake air amount Gair, the output side theoretical mixture ratio αp, the reformation side fuel air equivalence ratio φr, the EGR rate ψegr, the amount gi of reformation side suctioned gas, and the reformation side theoretical mixture ratio αr calculated as described above, and controls the reforming cylinder speed change device 59.

Upon determining that Formula 4 is not satisfied by controlling the reforming cylinder speed change device 59 in the state where the number of reforming cylinders Kr supplied with the fuel and the supply air is set to be the minimum number, the ECU 60 controls the opening of the first intake regulating valve 30, the second intake regulating valve 31, and the EGR gas regulating valve 32, to increase the number of reforming cylinders Kr supplied with the fuel and the supply air, and controls the main fuel injection device 20, the electromagnetic intake-valve switching valve 50, and the electromagnetic exhaust-valve switching valve 58 corresponding to the number of reforming cylinders Kr to which the fuel and the supply air are started to be supplied. Then, the ECU 60 calculates the reforming cylinder rotational speed Nr based on Formula 4, from the newly set number of reforming cylinders Kr, and controls the reforming cylinder speed change device 59.

Specifically, the ECU 60 controls the main fuel injection device 20 in such a manner that one reforming cylinder 15 not supplied with fuel is supplied with fuel. Furthermore, the ECU 60 controls the electromagnetic intake-valve switching valve 50 and the electromagnetic exhaust-valve switching valve 58 in such a manner that the first swing arm 38, corresponding to the reforming cylinder 15 not supplied with the supply air, swings in accordance with the profile of the second cam 47, and that the third swing arm 55 swings in accordance with the profile of the fourth cam 54. The ECU 60 newly sets the number of reforming cylinders Kr supplied with the fuel and the supply air, and calculates the reforming cylinder rotational speed Nr based on Formula 4, from the output side fuel air equivalence ratio φp, the output side intake air amount Gair, the output side theoretical mixture ratio αp, the reformation side fuel air equivalence ratio φr, the EGR rate ψegr, the amount gi of reformation side suctioned gas, and the reformation side theoretical mixture ratio αr calculated as described above, to control the reforming cylinder speed change device 59.

As described above, the ECU 60 of the engine 1 sets the number of reforming cylinders Kr supplied with the fuel and the supply air to a predetermined number, and controls the reforming cylinder speed change device 59 in such a manner that Formula 4 is satisfied. Upon determining that Formula 4 is not satisfied by controlling the reforming cylinder speed change device 59, the ECU 60 controls the opening of the first intake regulating valve 30, the second intake regulating valve 31, and the EGR gas regulating valve 32, and the main fuel injection device 20, the electromagnetic intake-valve switching valve 50, and the electromagnetic exhaust-valve switching valve 58 corresponding to the number of reforming cylinders Kr to which the supplying of the fuel and the supply air starts or stops, in such a manner that the number of reforming cylinders Kr supplied with the fuel and the supply air increases or decreases. Next, the ECU 60 calculates the reforming cylinder rotational speed Nr based on Formula 4, from new number of reforming cylinders Kr and controls the reforming cylinder speed change device 59. As a result, in the engine 1, the amount of reformed fuel supplied to the outputting cylinders 2 is changed, while maintaining the amount of reformed fuel discharged from each of the reforming cylinders 15 and the fuel air equivalence ratio of the reformed fuel. In other words, the mass balance between the fuel reformed by the reforming cylinders 15 and the fuel supplied to the outputting cylinders 2 remains unchanged even when the output of the outputting cylinders 2 changes. Thus, the reformed fuel can be supplied in accordance with the output of the outputting cylinders 2.

In the present embodiment, the engine 1 changes the reforming cylinder rotational speed Nr of the reforming cylinders 15 and the number of reforming cylinders Kr to control the amount of reformed fuel. However, this should not be construed in a limiting sense. For example, the engine 1 may be configured to control the reforming cylinder speed change device 59 for changing the reforming cylinder rotational speed Nr in such a manner that the amount of reformed fuel supplied to the outputting cylinders 2 is changed, while maintaining the amount of reformed fuel discharged from each of the reforming cylinders 15 and the fuel air equivalence ratio achieved by the reformed fuel. The engine 1 may also be configured to control the variable valve device 36 for controlling the opening and closing of the reforming intake valve 24 and the reforming exhaust valve 26 and for changing the number of reforming cylinders Kr in such a manner that the amount of reformed fuel supplied to the outputting cylinders 2 is changed, while maintaining the amount of reformed fuel discharged from each of the reforming cylinders 15 and the fuel air equivalence ratio of the reformed fuel.

Next, an operation mode of a variable valve device 36a according to another embodiment is described with reference to FIG. 9 to FIG. 13.

Figure 9:
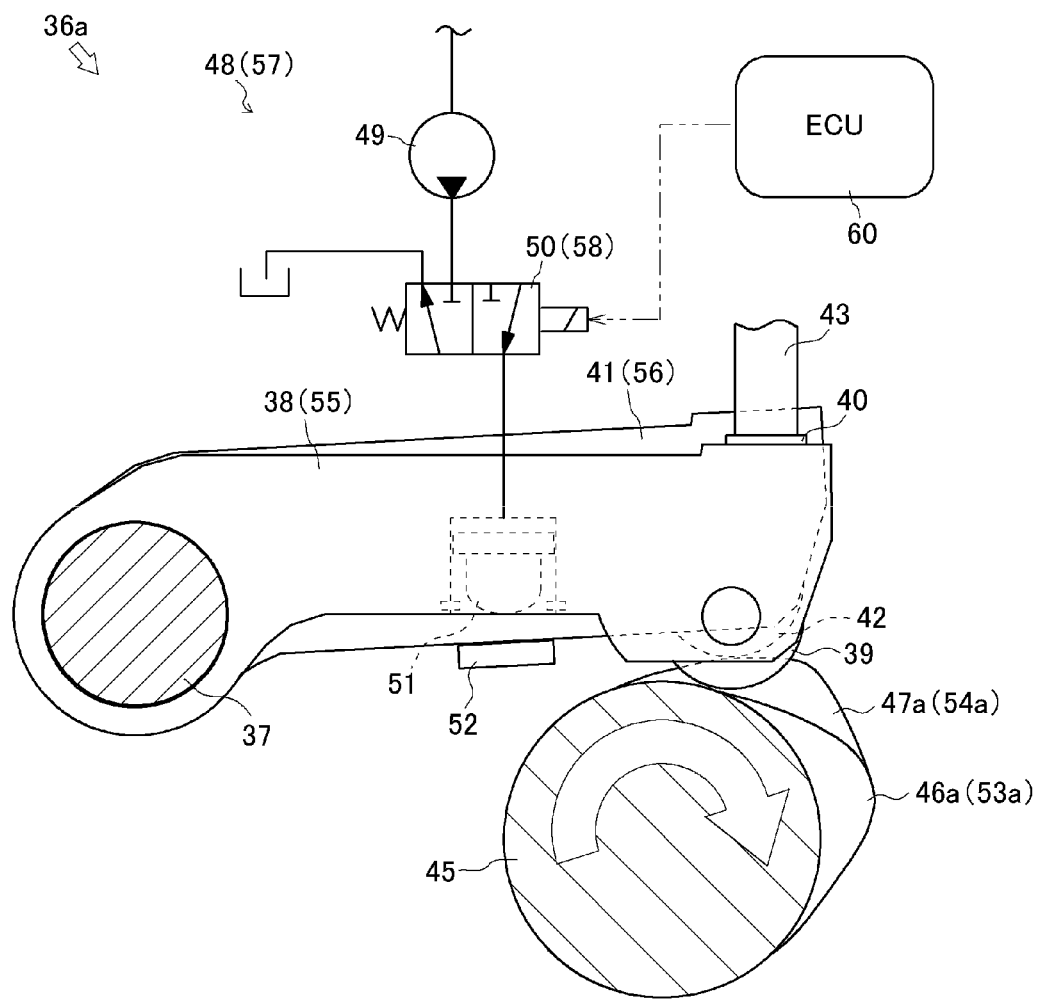
FIG. 9 is a partially enlarged side view illustrating a case where a hydraulic cylinder in a variable valve device in another embodiment of the present invention is not protrudent.

As illustrated in FIG. 9, when the ECU 60 controls the electromagnetic intake-valve switching valve 50 of the variable valve device 36a in such a manner that the bottom portion of the hydraulic piston 51 does not protrude toward the cam shaft 45, the first cam roller 39 of the first swing arm 38 rotates while being in contact with a first cam 46a. More specifically, the first swing arm 38 swings about the swing arm shaft 37 in accordance with the profile of the first cam 46a. The second cam roller 42 of the second swing arm 41 rotates while being in contact with a second cam 47a. More specifically, the second swing arm 41 rotates about the swing arm shaft 37 in accordance with the profile of a second cam 47a. The first swing arm 38 and the second swing arm 41 swing independently from each other.

When the first cam 46a and the second cam 47a rotate in a direction indicated by a white arrow, the first swing arm 38 and the second swing arm 41 simultaneously swing toward the side opposite to the cam shaft 45, in accordance with the profiles of the respective cams. When the first swing arm 38 swings toward the side opposite to the cam shaft 45, the reforming intake valve 24 opens via the push rod 43 fit in the rod support member 40 of the first swing arm 38, the valve arm 44, and an intake air coupling member 24a (see FIG. 3).

When the first cam 46a and the second cam 47a further rotate in the direction indicated by the white arrow, the first swing arm 38 swings toward the cam shaft 45 in accordance with the profile of the first cam 46a before the second swing arm 41 does. In this process, the first swing arm 38 has a side surface facing the cam shaft 45 provided with a recess, and thus does not come into contact with the receiving member 52. Thus, the receiving member 52 does not hinder the swinging toward the cam shaft 45. After the first swing arm 38 has been swung toward the cam shaft 45, the second swing arm 41 swings toward the cam shaft 45 in accordance with the profile of the second cam 47a. When the first swing arm 38 swings downward, the reforming intake valve 24 closes (see FIG. 3). In this manner, the first swing arm 38 and the second swing arm 41 operate independently from each other, and thus the opening and closing timings of the reforming intake valve 24 are determined in accordance with the operation of the first swing arm 38, and not in accordance with the operation of the second swing arm 41.

Figure 11A:
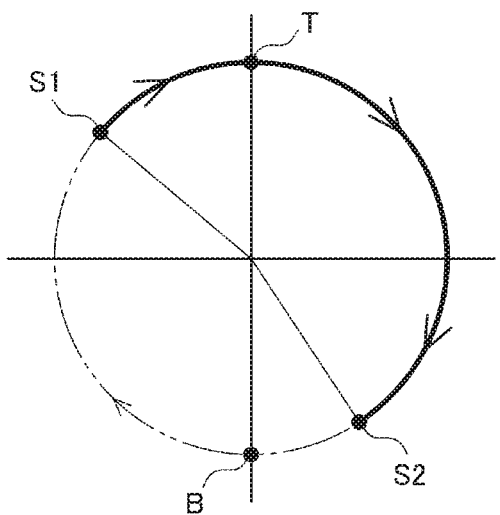
FIG. 11(a) and FIG. 11(b) are diagrams illustrating opening and closing timings of an intake valve in accordance with a profile of one cam in the variable valve device in another embodiment of the present invention, FIG. 11(a) illustrating a relationship between a crank angle and the opening and closing timings of the intake valve and FIG. 11(b) illustrating a relationship between the crank angle and a valve lift of the intake valve.
Figure 11B:
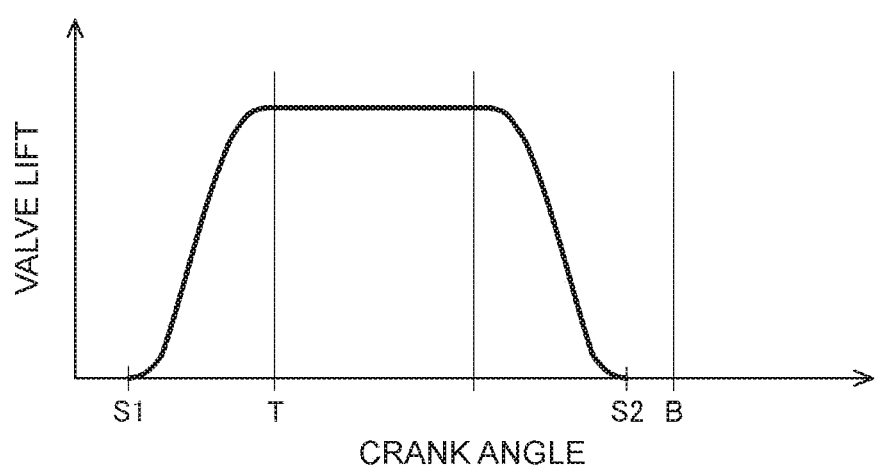

As illustrated in FIG. 11(a) and FIG. 11(b), the profile of the first cam 46a is designed in such a manner that the reforming intake valve 24 starts to open at a timing (S1) before the top dead point (hereinafter, referred to as an "intake air top dead point") T is reached by the reforming piston 18 in an intake stroke, and that the maximum valve lift of the reforming intake valve 24 is achieved when the intake air top dead point T is reached by the reforming piston 18. The profile of the first cam 46a is designed in such a manner that the reforming intake valve 24 starts to close at a timing before the reforming piston 18 reaches the bottom dead point (hereinafter, referred to as an "intake air bottom dead point") B in the intake stroke, and is completely closed at a timing (S2) before the reforming piston 18 reaches the intake air bottom dead point B. Thus, the first cam 46a is designed in such a manner that the reforming intake valve 24 opens and closes at timings earlier than the opening and closing timings of the reforming intake valve 24 determined by the second cam 47a described later.

Figure 10:
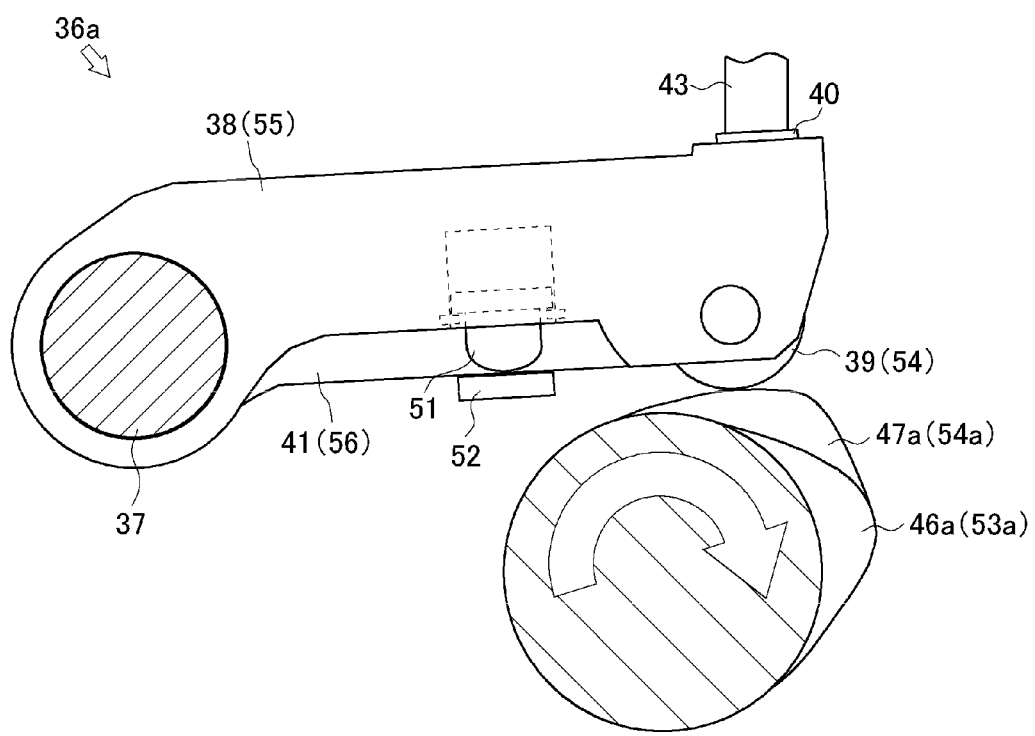
FIG. 10 is a partially enlarged side view illustrating a case where a hydraulic cylinder in a variable valve device in another embodiment of the present invention is protrudent.

As illustrated in FIG. 10, when the ECU 60 controls the electromagnetic intake-valve switching valve 50 of the variable valve device 36a in such a manner that the bottom portion of the hydraulic piston 51 protrudes toward the cam shaft 45, the bottom portion is pressed toward the cam shaft 45 by the hydraulic oil supplied to the hydraulic piston 51. The hydraulic piston 51 pressed by the hydraulic oil slides toward the cam shaft 45 to protrude from the side surface of the first swing arm 38 facing the cam shaft 45. The bottom portion of the hydraulic piston 51 comes into contact with the receiving member 52 attached to the second swing arm 41.

The first swing arm 38 enters a state of being supported by the second swing arm 41 when the hydraulic piston 51 comes into contact with the receiving member 52 of the second swing arm 41. Thus, the first swing arm 38 swings in accordance with the second swing arm 41 to which the receiving member 52 is attached, and not in accordance with the profile of the first cam 46a. More specifically, when the second swing arm 41 swings toward the cam shaft 45 in accordance with the profile of the second cam 47a, the first swing arm 38 also swings toward the cam shaft 45. When the first swing arm 38 swings toward the cam shaft 45, the reforming intake valve 24 is closed (see FIG. 3). All things considered, when the reforming intake valve 24 is closed, the first swing arm 38 integrally operates with the second swing arm 41, and the opening and closing timings of the reforming intake valve 24 are determined in accordance with the operation of the second swing arm 41.

Figure 12A:
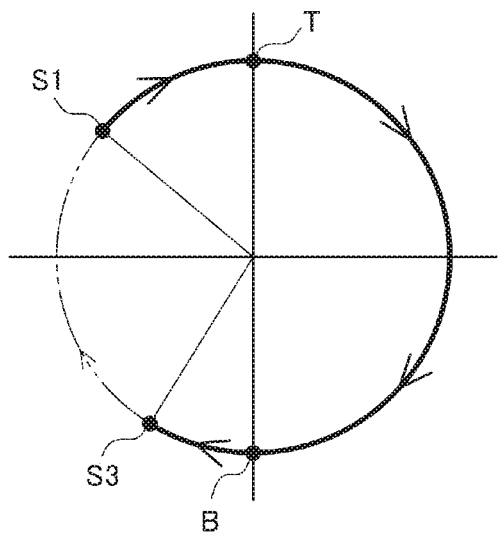
FIG. 12(a) and FIG. 12(b) are diagrams illustrating the opening and closing timings of the intake valve in accordance with a profile of the other cam in the variable valve device in another embodiment of the present invention, FIG. 12(a) illustrating a relationship between the crank angle and the opening and closing timings of the intake valve and FIG. 12(b) illustrating a relationship between the crank angle and the valve lift of the intake valve.
Figure 12B:
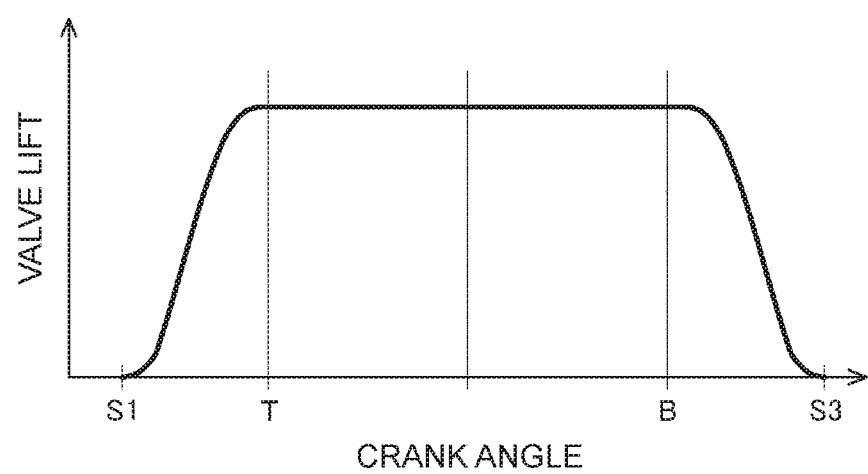
Figure 13:
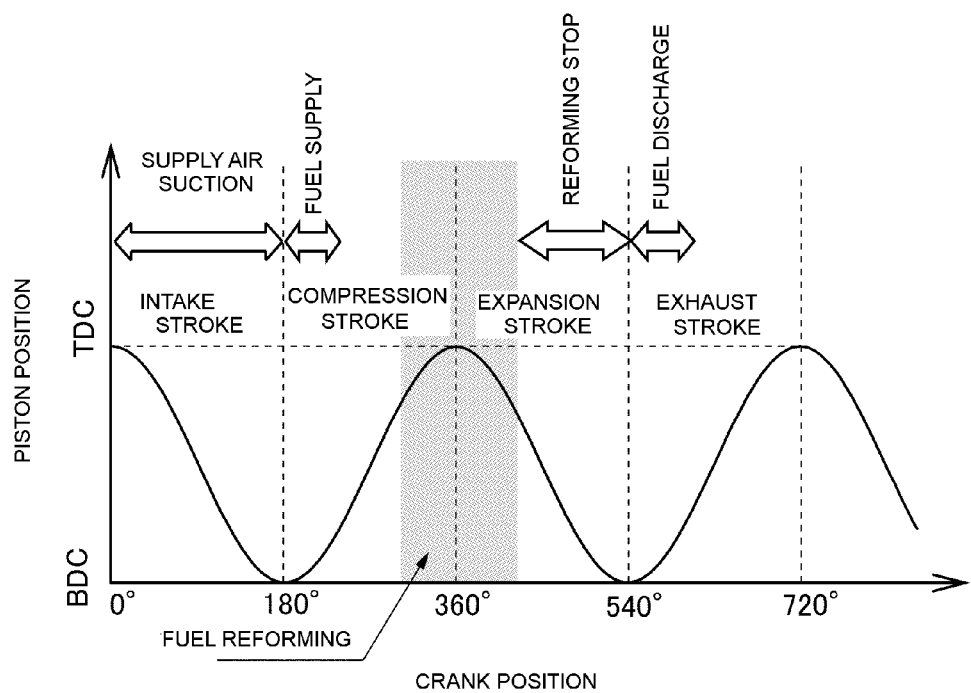
FIG. 13 is a chart representing a state in a reaction chamber at a crank position of a reforming cylinder in a variable valve device in another embodiment of the present invention.

As illustrated in FIG. 12(a) and FIG. 12(b), the profile of the second cam 47a is designed in such a manner that the reforming intake valve 24 starts to open at a timing (S1) before the reforming piston 18 reaches the intake air top dead point T, and the maximum valve lift of the reforming intake valve 24 is achieved when the reforming piston 18 reaches the intake air top dead point T. The profile is also designed in such a manner that the reforming intake valve 24 starts to close at a timing close to when the reforming piston 18 reaches the intake air bottom dead point B, and is completely closed at a timing (S3) thereafter. More specifically, the second cam 47a is designed in such a manner that the reforming intake valve 24 opens and closes at timings later than the opening and closing timings of the reforming intake valve 24 defined by the first cam 46a as described above. In the present embodiment, the reforming intake valve 24 starts to close at a timing close to when the reforming piston 18 reaches the intake air bottom dead point B. However, the present invention is not limited to this. More specifically, the reforming intake valve 24 may start to close when the reforming piston 18 reaches the intake air bottom dead point B.

The ECU 60 can change the opening and closing timings of the reforming exhaust valve 26 by switching the electromagnetic exhaust-valve switching valve 58 of the variable valve device 36a, as in the operation mode in which the opening and closing timings of the reforming intake valve 24 are switched by the variable valve device 36a. The third cam 53a that swings the third swing arm 55 starts to open and close the reforming exhaust valve 26 at a timing earlier than the opening and closing timings of the reforming exhaust valve 26 defined by the fourth cam 54a that swings the fourth swing arm 56.

As illustrated in FIG. 9, when the ECU 60 controls the electromagnetic exhaust-valve switching valve 58 of the variable valve device 36a in such a manner that the bottom portion of the hydraulic piston 51 of the third swing arm 55 does not protrude toward the cam shaft 45, the third swing arm 55 and the fourth swing arm 56 swing independently from each other. More specifically, the third swing arm 55 operates in accordance with the profile of the third cam 53a and the fourth swing arm 56 operates in accordance with the profile of the fourth cam 54a. Thus, the opening and closing timings of the reforming exhaust valve 26 are determined in accordance with the operation of the third swing arm 55, and not in accordance with the operation of the fourth swing arm 56.

As illustrated in FIG. 10, when the ECU 60 controls the electromagnetic exhaust-valve switching valve 58 of the variable valve device 36a in such a manner that the bottom portion of the hydraulic piston 51 of the third swing arm 55 protrudes toward the cam shaft 45, the third swing arm 55 enters a state of being supported by the fourth swing arm 56 with the hydraulic piston 51 coming into contact with the receiving member 52 of the fourth swing arm 56. Thus, the third swing arm 55 swings in accordance with the swinging of the fourth swing arm 56 to which the receiving member 52 is attached, and not in accordance with the profile of the third cam 53a. Thus, the opening and closing timings of the reforming exhaust valve 26 are determined in accordance with the operation of the fourth swing arm 56, and not in accordance with the operation of the third swing arm 55. In the present embodiment, the compression rate and the expansion rate are controlled by switching the cams with the hydraulic piston 51. However, this should not be construed in a limiting sense. Any mechanism, for example, an overhead cam variable valve mechanism or the like, capable of changing the compression rate and the expansion rate may be employed.

Next, how the compression rate and the expansion rate in the reforming cylinders 15 are controlled is described.

Upon determining that reformed fuel temperature Tf is higher than an upper limit value Tu based on a signal acquired from the reformed fuel temperature sensor 29, the ECU 60 controls the electromagnetic intake-valve switching valve 50 of the intake air switching unit 48 in such a manner that the first swing arm 38 that opens and closes the reforming intake valve 24 swings in accordance with the profile of the first cam 46a (see FIG. 11(a) and FIG. 11(b)). More specifically, the ECU 60 controls the electromagnetic intake-valve switching valve 50 in such a manner that the supply air supplied to the reforming cylinders 15 is reduced. Thus, the substantial compression rate of the reforming cylinders 15 is reduced, whereby the temperature of the reformed fuel adiabatically compressed by the reforming cylinders 15 is prevented from rising.

Upon determining that the reformed fuel temperature Tf is higher than the upper limit value Tu based on a signal acquired from the reformed fuel temperature sensor 29, the ECU 60 controls the electromagnetic exhaust-valve switching valve 58 of the exhaust air switching unit 57 in such a manner that the third swing arm 55 that opens and closes the reforming exhaust valve 26 swings in accordance with the profile of the fourth cam 54a (see FIG. 12(a) and FIG. 12(b)). More specifically, the ECU 60 controls the electromagnetic exhaust-valve switching valve 58 in such a manner that the reformed fuel is discharged at a timing close to when the reforming cylinder 15 reaches the bottom dead point. Thus, the substantial expansion rate of the reforming cylinders 15 increases, and the temperature drop of the reformed fuel adiabatically expanded by the reforming cylinders 15 is facilitated.

Upon determining that the reformed fuel temperature Tf is higher than the upper limit value Tu based on a signal acquired from the reformed fuel temperature sensor 29, the ECU 60 may control the electromagnetic intake-valve switching valve 50 of the intake air switching unit 48 in such a manner that the first swing arm 38 that opens and closes the reforming intake valve 24 swings in accordance with the profile of the first cam 46a (see FIG. 11(a) and FIG. 11(b)), and may control the electromagnetic exhaust-valve switching valve 58 of the exhaust air switching unit 57 in such a manner that the third swing arm 55 that opens and closes the reforming exhaust valve 26 swings in accordance with the profile of the fourth cam 54a (see FIG. 12(a) and FIG. 12(b)). Thus, in the reforming cylinders 15, the substantial compression rate decreases, and the substantial expansion rate increases.

Upon determining that cooling water temperature Tw of the engine 1 acquired from an unillustrated cooling water sensor is equal to or lower than a lower limit value Tl or that it is within a predetermined time period from the start time of the engine, the ECU 60 controls the electromagnetic intake-valve switching valve 50 of the intake air switching unit 48 in such a manner that the first swing arm 38 that opens and closes the reforming intake valve 24 swings in accordance with the profile of the second cam 47a regardless of the reformed fuel temperature Tf acquired from the reformed fuel temperature sensor 29 (see FIG. 12(a) and FIG. 12(b)). More specifically, the ECU 60 controls the electromagnetic intake-valve switching valve 50 in such a manner that the supply air supplied to the reforming cylinders 15 increases. Thus, in the reforming cylinders 15, the substantial compression rate increases, pressure and temperature after the adiabatical compression by the reforming cylinders 15 rise, and the fuel reforming reaction is facilitated.

As described above, in the engine 1 including the outputting cylinders 2 and the reforming cylinders 15 that reform fuel through back and forth movement of the reforming piston 18, the opening and closing timings of at least one of the reforming intake valve 24 and the reforming exhaust valve 26 are changed by using the variable valve device 36a based on a signal acquired from the reformed fuel temperature sensor 29. When the reformed fuel temperature Tf is higher than the upper limit value Tu, the temperature of the reformed fuel is maintained within a defined range in the engine 1, with the substantial expansion rate of the reforming cylinders 15 increasing and the substantial compression rate of the reforming cylinders 15 decreasing. Thus, the reformed fuel can be supplied in a stable state regardless of the operation condition, whereby the output of the engine can be prevented from degrading.

In the engine 1, when the result of the determination indicates that the cooling water temperature Tw acquired from the cooling water sensor is equal to or lower than the predetermined value or that it is within a predetermined time period from the start time of the engine 1, the opening and closing timings of the reforming intake valve 24 are changed by using the variable valve device 36a regardless of the reformed fuel temperature Tf. Thus, in the engine 1, the substantial compression rate of the reforming cylinders 15 increases, so that the fuel reforming can be ensured even when the engine 1 or the outer air is at a low temperature. Thus, the reformed fuel is supplied in the stable state regardless of the operation condition, whereby the degradation of the engine output can be prevented.

Reforming cylinders 15a in an engine according to still another embodiment of the present invention are described with reference to FIG. 14 to FIG. 16.

The reforming cylinders 15a, serving as the fuel reforming device, reform a higher hydrocarbon fuel such as light oil into a lower hydrocarbon fuel (for example, methane) to prevent preignition. The reforming cylinders 15a adiabatically compress a result of injecting fuel to a mixture (hereinafter simply referred to as "supply air") of intake air and exhaust air (EGR gas) to reform the fuel. The reforming cylinders 15a each include the reforming cylinder head 16, the reforming cylinder 17, the reforming piston 18, the reforming connecting rod 19, the main fuel injection device 20, and an additive injection device 61.

The additive injection device 61 supplies water as an additive into the reaction chamber 23. The additive injection device 61 is provided to the reforming cylinder head 16. The additive injection device 61 can supply an appropriate amount of water as the additive into the reaction chamber 23 at an appropriate timing. The additive injection device 61 is coupled with an additive storage tank 62 via an unillustrated additive injection pump. The additive storage tank 62 is provided with a remaining additive sensor 62a. The additive injection device 61 includes a nozzle such as a pintle nozzle, a swirl injector, and an air-assist injector. In the present embodiment, the additive injection device 61 is directed toward the inside of the reaction chamber 23 from the reforming cylinder head 16. However, this should not be construed in a limiting sense. Alternatively, the additive injection device 61 may be provided to inject water into the supply pipe 25. The intake pipe 11 is provided with an intake air detection sensor 11a that is more on the upstream side than the coupled position of the supply pipe 25. The intake air detection sensor 11a detects an intake air flow amount A0 as a total intake air flow amount from the outer air and an absolute humidity H of the intake air.

The ECU 60 as the control device controls the engine 1. Specifically, the ECU 60 controls the secondary fuel injection device 6, the main fuel injection device 20, the additive injection device 61, the first intake regulating valve 30, the second intake regulating valve 31, the EGR gas regulating valve 32, and the like. The ECU 60 stores therein various programs and data for controlling the engine 1. The ECU 60 may be connected to a CPU, a ROM, a RAM, an HDD, and the like via a bus, or may be a one-chip LSI or the like.

As illustrated in FIG. 6, the ECU 60 stores therein: various programs for controlling fuel injection; the main fuel injection amount Qm map M1 for calculating the main fuel injection amount Qm based on the amount of an additive (water in the present embodiment) with which the thermal decomposition reaction per unit fuel of the fuel used can be most facilitated and based on the target rotational speed Np and the target output Wt of the engine 1; the intake air flow amount map M2 for calculating the outputting intake air flow amount A1 for supplying to the combustion chamber 9 of the outputting cylinder 2, based on the target rotational speed Np and the main fuel injection amount Qm; the mixture flow amount map M3 for calculating the reforming intake air flow amount A2 and the EGR gas flow amount A3 for supplying to the reaction chamber 23 of the reforming cylinder 15a based on the target rotational speed Np and the main fuel injection amount Qm; the secondary fuel injection amount map M4 for calculating the secondary fuel injection amount Qs for ignition to be injected into the combustion chamber 9 based on the target rotational speed Np and the main fuel injection amount Qm; and the like.

The ECU 60 is coupled with the intake air detection sensor 11a and can acquire the intake air flow amount A0 and the absolute humidity H of the intake air detected by the intake air detection sensor 11a.

The ECU 60 is coupled with the remaining additive sensor 62a and can acquire a signal indicating a remaining amount of the additive in the additive storage tank 62 detected by the remaining additive sensor 62a.

An operation mode of the components of the engine 1 according to one embodiment of the present invention is described below with reference to FIG. 14 to FIG. 16.

First of all, paths of intake air and exhaust air in the engine 1 are described.

Figure 14:
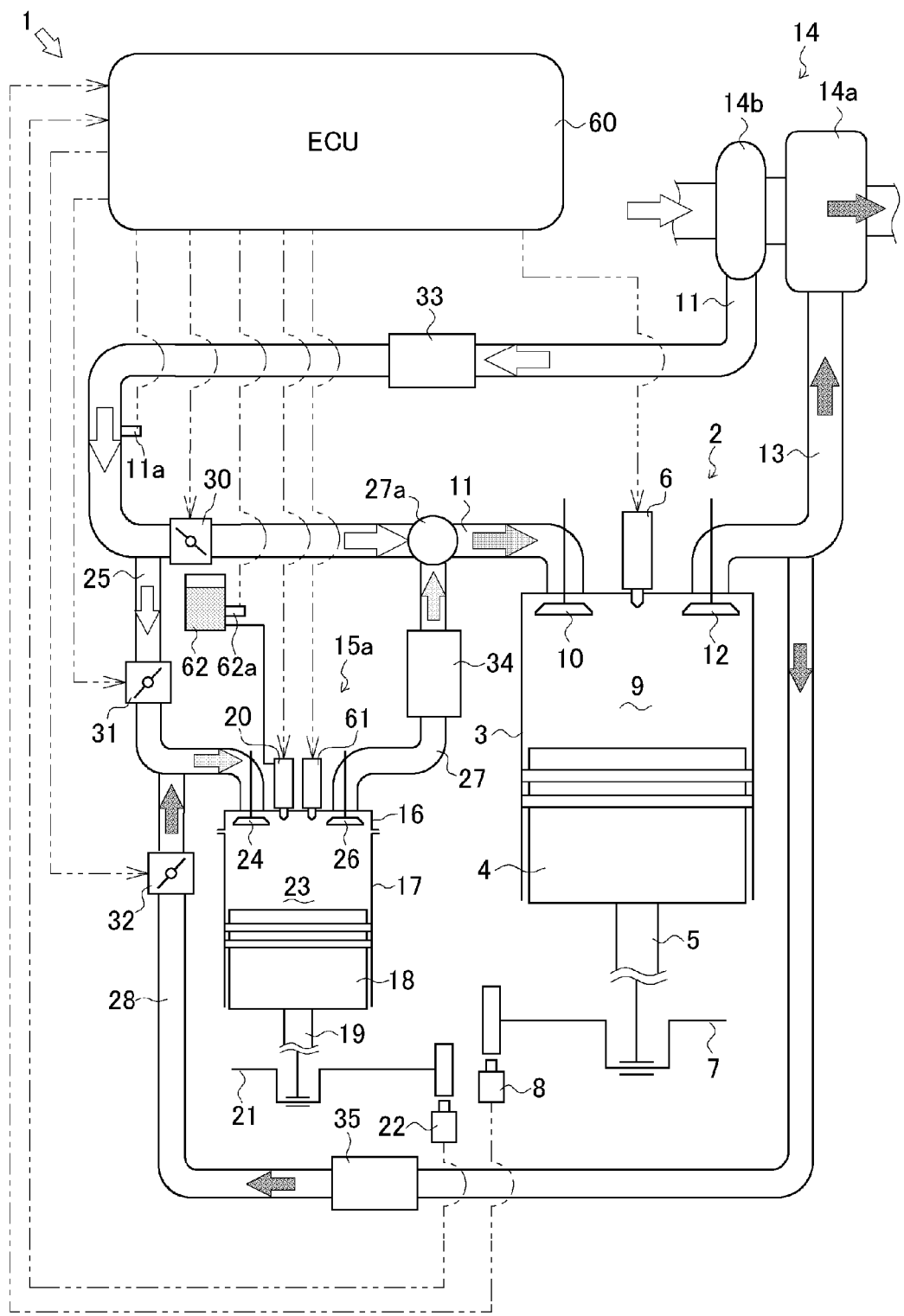
FIG. 14 is a schematic view illustrating a configuration of a reforming cylinder in still another embodiment of the present invention.

As illustrated in FIG. 14, the outer air sucked in by the compressor 14b of the supercharger 14 is discharged to the intake pipe 11 as intake air in an adiabatically compressed state. The intake air is cooled by the intake air intercooler 33, and then is supplied to the combustion chamber 9 of the outputting cylinder 2 through the intake pipe 11. The intake air is partially supplied to the reaction chamber 23 of the reforming cylinder 15a via the supply pipe 25 coupled with the intake pipe 11 and the reforming intake valve 24.

The exhaust air from the combustion chamber 9 of the outputting cylinder 2 rotates the turbine 14a of the supercharger 14 through the exhaust pipe 13, and then is discharged outside. The exhaust air is partially supplied to the reaction chamber 23 of the reforming cylinder 15a as the EGR gas, through the EGR pipe 28 and the supply pipe 25 coupled with the EGR pipe 28.

The supply air (the intake air and the EGR gas) supplied to the reaction chamber 23 is adiabatically compressed by the reforming piston 18 in the reaction chamber 23 together with the injected fuel and water as the additive. The supply air and the reformed fuel are adiabatically expanded due to the movement of the reforming piston 18. Then, the supply air and the reformed fuel are discharged from the reaction chamber 23 as a result of the compression due to the movement of the reforming piston 18, and then are recirculated to the intake pipe 11, via the reforming exhaust valve 26 and through the exhaust pipe 27, to be supplied to the combustion chamber 9.

Figure 15:
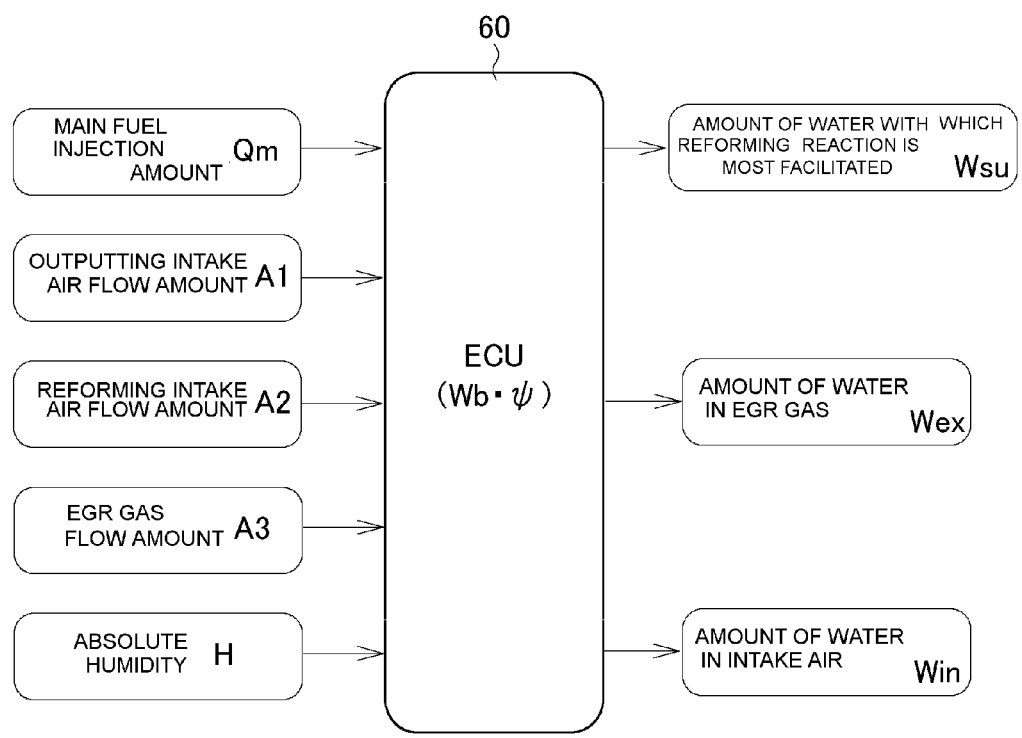
FIG. 15 is a schematic view illustrating a control configuration for calculating the amount of an additive in the reforming cylinder according to still another embodiment of the present invention.

As illustrated in FIG. 15, the ECU 60 calculates an amount Wsu of water with which the reforming reaction of the fuel supplied to the reforming cylinders 15 by the main fuel injection amount Qm is most facilitated, based on the main fuel injection amount Qm and an amount Wb of the additive (water in the present embodiment) with which the reforming reaction per unit fuel used can be most facilitated.

The ECU 60 calculates an amount of water Wex in the EGR gas supplied to the reaction chamber 23 of the reforming cylinder 15, from an exhaust air recirculation rate $\psi$ based on the main fuel injection amount Qm, the reforming intake air flow amount A2, and the EGR gas flow amount A3.

The ECU 60 calculates the amount of water Win in the intake air supplied to the reaction chamber 23 of the reforming cylinder 15a from the reforming intake air flow amount A2 and the absolute humidity H detected by the intake air detection sensor 11a.

The ECU 60 calculates an amount of water Wad supplied to the reaction chamber 23 via the additive injection device 61, from the amount of water Wsu with which the reforming reaction of the fuel supplied by the main fuel injection amount Qm can be most facilitated, the amount of water Wex in the EGR gas, and the amount of water Win supplied in the intake air supplied to the reaction chamber 23, based on the following Formula 1.

$$Wad = Wsu - Win - Wex \qquad \text{[Formula 5]}$$

Next, how the fuel is reformed in the reforming cylinders 15 is described with reference to FIG. 16.

Figure 16:
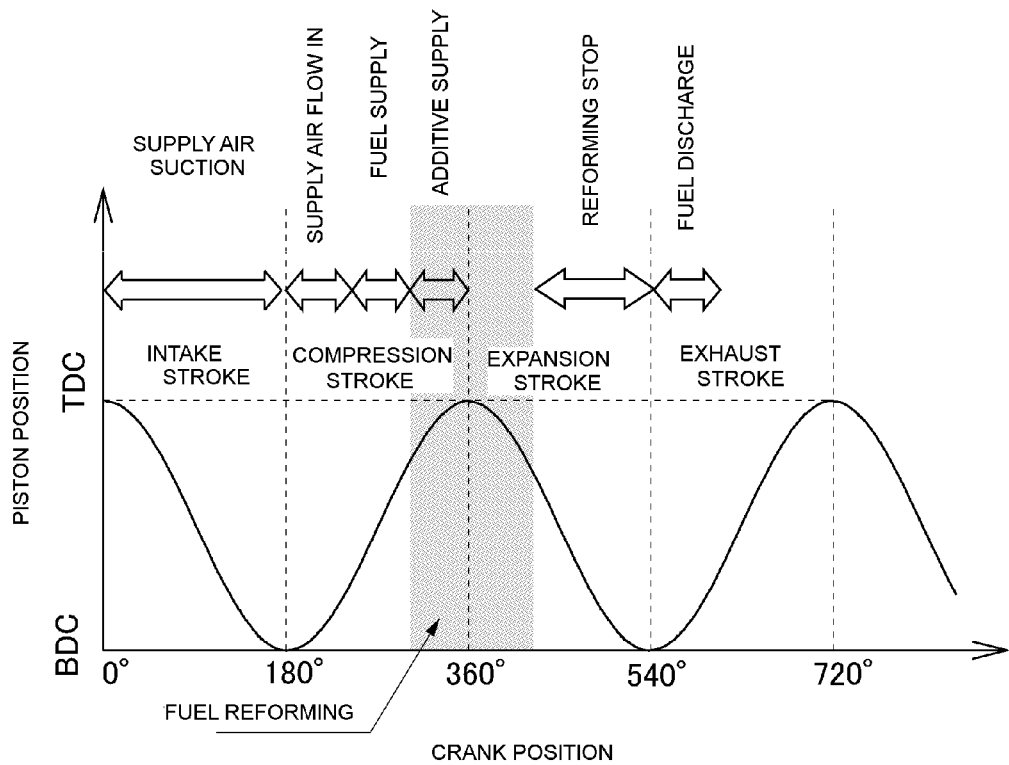
FIG. 16 is a chart representing a state in a reaction chamber at a crank position of the reforming cylinder in still another embodiment of the present invention.

As illustrated in FIG. 16, when the reforming cylinder 15a is in the intake stroke, the reforming piston 18 in the reforming cylinders 15a moves from the top dead point to the bottom dead point. Thus, the internal pressure of the reaction chamber 23 of the reforming cylinder 15a drops due to the volume increase as a result of the movement of the reforming piston 18. When the reforming cylinder 15 is in the intake stroke, the valve opens for supplying the supply air and the exhaust air to the reaction chamber 23. The ECU 60 controls the opening and closing of the second intake regulating valve 31 based on the acquired reforming crankshaft angle θ2, in such a manner that the intake air is supplied into the reaction chamber 23 of the reforming cylinders 15a by the calculated reforming intake air flow amount A2, due to the decreased internal pressure while the reforming cylinder 15 is in the intake stroke (for example, while the reforming piston 18 is close to the bottom dead point). Furthermore, the ECU 60 controls the opening and closing of the EGR gas regulating valve 32 in such a manner that the EGR gas is supplied into the reaction chamber 23 of the reforming cylinders 15a by the calculated EGR gas flow amount A3. Thus, the supply air at an oxygen concentration suitable for fuel reforming is supplied to the reaction chamber 23 (supply air suction in FIG. 16).

When the reforming cylinder 15a is in the compression stroke, the reforming piston 18 moves from the bottom dead point to the top dead point. Thus, the internal pressure of the reaction chamber 23 of the reforming cylinders 15a rises due to the volume decrease as a result of the movement of the reforming piston 18. Thus, the supply air supplied to the reaction chamber 23 is adiabatically compressed by the reforming piston 18. With the adiabatical compression of the supply air by the reforming cylinders 15a, the high-temperature and high-pressure state is achieved in the reaction chamber 23.

When the reforming cylinder 15a is in the compression stroke, the ECU 60 controls the main fuel injection device 20 based on the acquired reforming crankshaft angle θ2, in such a manner that the fuel is supplied to the reaction chamber 23 of the reforming cylinder 15 by the calculated main fuel injection amount Qm. Thus, the fuel is injected into the reaction chamber 23 of the reforming cylinder 15a in the high-temperature and high-pressure state (fuel supply in FIG. 16). The fuel, achieving a fuel air equivalence ratio required for reforming to the lower hydrocarbon fuel by using the supply air supplied to the reaction chamber 23, is supplied to the reaction chamber 23.

The ECU 60 controls the additive injection device 61 based on the acquired reforming crankshaft angle θ2, in such a manner that water as the additive is supplied to the reaction chamber 23 of the reforming cylinder 15a, by the amount Wad calculated based on Formula 1 described above.

The injected fuel in the reaction chamber 23 is dispersed and is quickly mixed (premixed) with the supply air in the reaction chamber 23 in the high-temperature and higher pressure state to be evaporated. The reforming reaction of the fuel premixed with the supply air starts when the reforming piston 18 reaches a point close to the top dead point to achieve the highest-temperature and highest-pressure state in the reaction chamber 23 (a gray area in FIG. 16). The reforming reaction of the higher hydrocarbon fuel is facilitated by water added as the additive. The higher hydrocarbon reacts with water in the high-temperature and high-pressure state, and thus is reformed into carbon oxide and hydrogen as in the following Chemical Formula 1, or is reformed into carbon dioxide and hydrogen as in the following Chemical Formula 2. Hydrogen generated by the reforming reaction separates carbon from the higher hydrocarbon to contribute to the reforming to obtain the lower hydrocarbon.

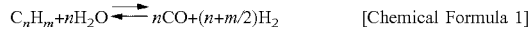

$C_nH_m + nH_2O \rightleftharpoons nCO + (n+m/2)H_2$  [Chemical Formula 1]

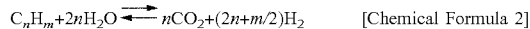

$C_nH_m + 2nH_2O \rightleftharpoons nCO_2 + (2n+m/2)H_2$  [Chemical Formula 2]

When the reforming cylinder 15a is in an expansion stroke, the reforming piston 18 moves from the top dead point to the bottom dead point. Thus, the internal pressure of the reaction chamber 23 of the reforming cylinder 15a drops due to the volume increase caused by the movement of the reforming piston 18. The reformed fuel is adiabatically expanded due to the volume increase in the reaction chamber 23. Thus, the reformed fuel is cooled to be in a pressure drop state, whereby the reforming reaction stops (reforming stop in FIG. 16).

When the reforming cylinder 15a is in the exhaust stroke, the reforming piston 18 moves from the bottom dead point to the top dead point. Thus, the internal pressure of the reaction chamber 23 of the reforming cylinder 15a rises due to the volume decrease caused by the movement of the reforming piston 18. When the reforming cylinder 15a is in the exhaust stroke, the reforming exhaust valve 26 opens for discharging the reformed fuel from the reaction chamber 23. Thus, the reformed fuel is discharged from the reaction chamber 23 via the reforming exhaust valve 26, to be recirculated to the intake pipe 11 through the exhaust pipe 27 (fuel discharge in FIG. 16).

The reformed fuel is supplied as high temperature fuel gas to the exhaust pipe 27, due to residual heat, in the heat of the supply air, not used for endothermic decomposition reaction in the reforming. The high temperature reformed fuel supplied to the exhaust pipe 27 is cooled by the reformed fuel intercooler 34 of the exhaust pipe 27. Thus, self-preignition in the outputting cylinders 2 is prevented. The reformed fuel cooled by the reformed fuel intercooler 34 is supplied to the intake pipe 11 via the mixer 27a.

Upon determining that the remaining amount of water as the additive in the additive storage tank 62 is smaller than a reference value based on a signal acquired from the remaining additive sensor 62a, the ECU 60 controls one or a plurality of the secondary fuel injection device 6, the main fuel injection device 20, the second intake regulating valve 31, and the EGR gas regulating valve 32 so that at least one of the secondary fuel injection amount Qs, the main fuel injection amount Qm, the reforming intake air flow amount A2, and the exhaust air recirculation rate ψ is increased or reduced. For example, when the absolute humidity H is high, the ECU 60 performs control in such a manner that the opening of the second intake regulating valve 31 increases and the opening of the EGR gas regulating valve 32 decreases, and thus the reforming intake air flow amount A2 increases. Thus, the amount of water Wsu supplied to the reaction chamber 23 includes the amount of water Win in the intake air with an increased rate and the amount of water Wad supplied to the reaction chamber 23 via the additive injection device 61 decreased, in accordance with Formula 1.

As described above, in the engine 1 including the reforming cylinders 15a supplied with the supply air and the fuel, water as the additive is supplied from the additive injection device 61 to the reforming cylinders 15a, based on the amount of supplied fuel and the supply air amount. The ECU 60 of the engine 1 calculates the amount of water Wsu with which the reforming reaction of the fuel supplied to the reforming cylinders 15a by the main fuel injection amount Qm is most facilitated, the amount of water Win in the intake air, and the amount of water Wex in the EGR gas, and performs control in such a manner that water in the amount Wad, required for the amount of water Wsu to be in the reforming cylinders 15a, is supplied from the additive injection device 61. In the engine 1 according to the present invention having the configuration described above, the amount of water supplied from the additive injection device 61 is changed in accordance with the amount of water in the supply air changing in accordance with the operation state and the operation environment. Thus, in the engine 1, an appropriate amount of water as the additive, for facilitating the reforming reaction, can be supplied from the additive injection device 61.

In the engine 1, when the storage amount of the additive storage tank 62 drops below the reference value, the ECU 60 controls one or a plurality of the secondary fuel injection device 6, the main fuel injection device 20, the second intake regulating valve 31, and the EGR gas regulating valve 32 so that at least one of the secondary fuel injection amount Qs, the main fuel injection amount Qm, the reforming intake air flow amount A2, and the exhaust air recirculation rate ψ increases or decreases. With this configuration, water in the intake air and the exhaust air is used so that the amount of water Wad that needs to be supplied from the additive injection device 61 can be reduced. Thus, the appropriate amount of additive for promoting the reforming reaction can be supplied.

Reforming cylinders 15b of an engine according to yet still another embodiment of the present invention are described with reference to FIG. 17 to FIG. 21.

The reforming cylinders 15b, serving as the fuel reforming device, reform a higher hydrocarbon fuel such as light oil into a lower hydrocarbon fuel (for example, methane) to prevent preignition. The reforming cylinders 15b adiabatically compress a result of injecting fuel to a mixture of intake air and exhaust air (EGR gas) to reform the fuel. The reforming cylinders 15b each include the reforming cylinder head 16, the reforming cylinder 17, the reforming piston 18, the reforming connecting rod 19, a reaction chamber 64, and the main fuel injection device 20.

The reforming cylinders 15b each include an expansion chamber 63 defined by the reforming cylinder head 16, the reforming cylinder 17, and an end surface of the reforming piston 18. The volume of the expansion chamber 63 changes in accordance with the back and forth movement of the reforming piston 18. The supply air and the fuel are adiabatically compressed through the change in the volume of the expansion chamber 63.

The reaction chamber 64 is formed in the reforming cylinder head 16 of the reforming cylinder 15b. The reaction chamber 64 is a space where the supply air and the fuel are premixed, and the reforming reaction occurs. The reaction chamber 64 of the reforming cylinder head 16 has a substantially spherical shape. The shape of the reaction chamber 64 is not limited to the substantially spherical shape, and may be any shape, such as an elliptical shape, with which swirling current can be generated. The reaction chamber 64 is provided with the main fuel injection device 20. The main fuel injection device 20 injects the fuel only into the reaction chamber 64. Thus, the main fuel injection device 20 is positioned in such a manner that the injected fuel does not reach the inside of the expansion chamber 63 through a communication hole 65. The main fuel injection device 20 includes a nozzle such as a pintle nozzle, a swirl injector, and an air-assist injector.

A communication hole 65, communicating between the expansion chamber 63 and the reaction chamber 64, is formed in the reforming cylinder head 16. The communication hole 65 is deviated to one side of the reaction chamber 64 to have an axis not passing the center of the reaction chamber 64. Thus, in the reforming cylinder 15b, gas that has flowed into the reaction chamber 64 from the expansion chamber 63 through the communication hole 65, swirls in the reaction chamber 64, whereby the swirling flow is generated. The communication hole 65 is formed to face an end surface of the reforming piston 18. Thus, the communicated state of the expansion chamber 63 and the reaction chamber 64 is maintained regardless of the position of the top dead point of the reforming piston 18. Thus, the top dead point of the reforming piston 18 can be set at any position in the reforming cylinder 15b. In the present embodiment, the number of communication hole 65 is one. However, this should not be construed in a limiting sense. A plurality of the communication holes 65 may be formed as long as the swirling flow is generated in the reaction chamber 64.

The compression rate of the reforming cylinders 15b is set to be equal to or higher than 15 (for example, about 15 to 20) considering the heat loss. In the reforming cylinder 15b, the volume ratio of the reaction chamber 64 to the expansion chamber 63, in a state of having the smallest volume due to the reforming piston 18 being positioned at the top dead point, is 3:7. Thus, in the reforming cylinder 15b, when the fuel that has been reformed in the reaction chamber 64 is adiabatically expanded in the expansion chamber 63, the amount of reformed fuel oxidized in the reaction chamber 64 by oxygen in the unreacted supply air remaining in the expansion chamber 63 can be reduced.

Figure 18:
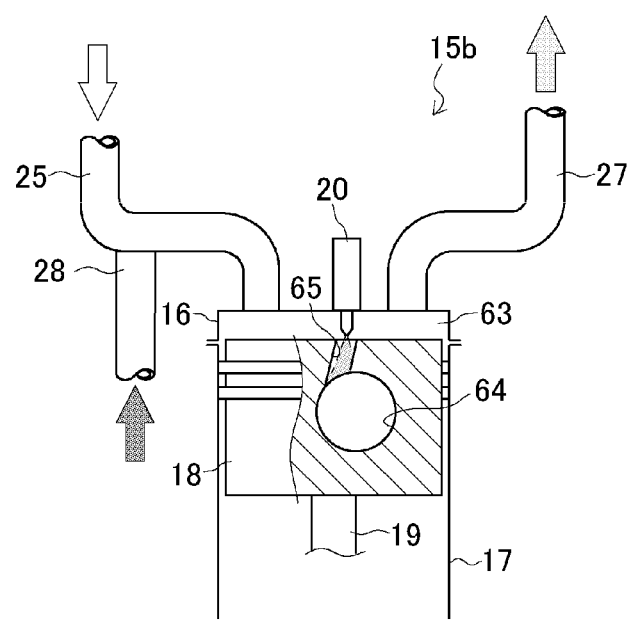
FIG. 18 is a schematic view illustrating a configuration in an embodiment in which a reaction chamber is arranged in a piston of the reforming cylinder in yet still another embodiment of the present invention.

In the present embodiment, the reaction chamber 64 is formed in the reforming cylinder head 16. However, this should not be construed in a limiting sense. For example, as illustrated in FIG. 18, the reaction chamber 64 may be formed in the reforming piston 18. The reaction chamber 64 in the reforming piston 18 has a substantially spherical shape. The communication hole 65, communicating between the expansion chamber 63 and the reaction chamber 64, is formed in the reforming piston 18. The communication hole 65 is deviated to one side of the reaction chamber 64 to have an axis not passing the center of the reaction chamber 64. Thus, in the reforming cylinder 15b, gas that has flowed into the reaction chamber 64 from the expansion chamber 63 through communication hole 65, swirls in the reaction chamber 64, whereby the swirling flow is generated. In this embodiment, the main fuel injection device 20 is provided to the reforming cylinder head 16. The main fuel injection device 20 injects the fuel into the reaction chamber 64 through the communication hole 65 formed in the reforming piston 18. Thus, the supply air and the fuel can be premixed in the reaction chamber 64 formed in the reforming piston 18 that moves back and forth.

Figure 19:
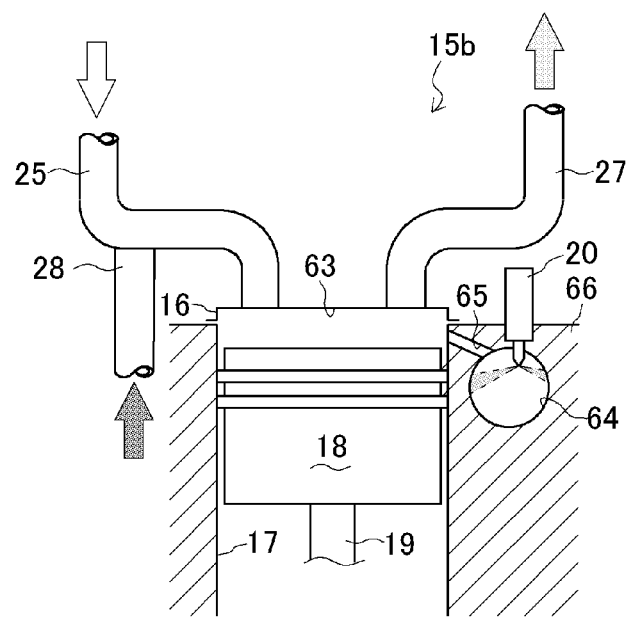
FIG. 19 is a schematic view illustrating a configuration in an embodiment in which a reaction chamber is arranged in a cylinder block of the reforming cylinder in yet still another embodiment of the present invention.

As illustrated in FIG. 19, the reaction chamber 64 may be formed in a cylinder block 66 where the reforming cylinder 17 is formed. The reaction chamber 64 in the cylinder block 66 has a substantially spherical shape. The communication hole 65, communicating between the expansion chamber 63 and the reaction chamber 64, is formed in the cylinder block 66. The communication hole 65 is deviated to one side of the reaction chamber 64 to have an axis not passing the center of the reaction chamber 64. Thus, in the reforming cylinder 15b, gas that has flowed into the reaction chamber 64 from the expansion chamber 63 through communication hole 65, swirls in the reaction chamber 64, whereby the swirling flow is generated. In this embodiment, the main fuel injection device 20 is provided to the reaction chamber 64.

Figure 17:
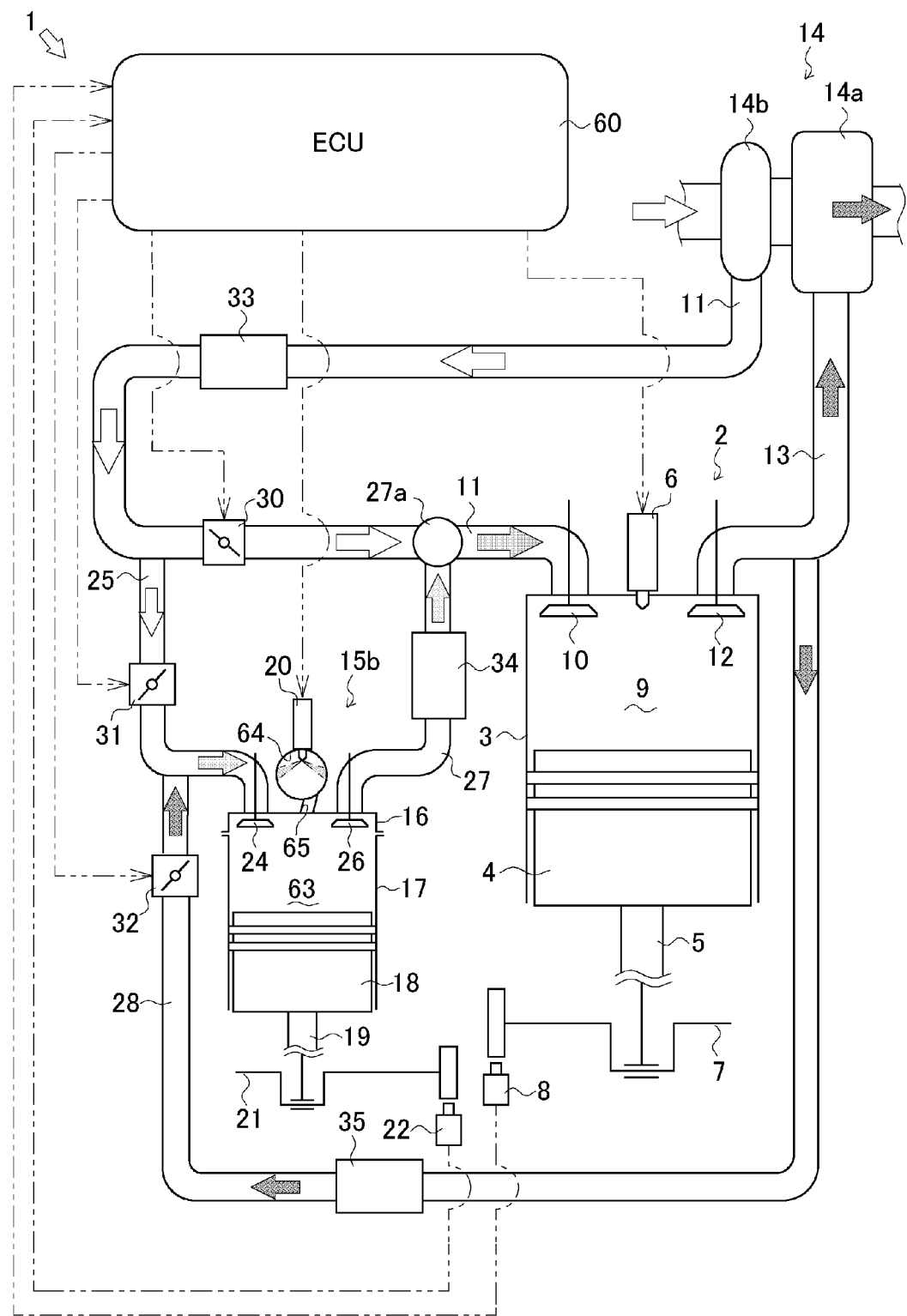
FIG. 17 is a schematic view illustrating a configuration of a reforming cylinder in yet still another embodiment of the present invention.

As illustrated in FIG. 17, the reforming cylinder 15b is coupled with the supply pipe 25 via the reforming intake valve 24 and with the exhaust pipe 27 via the reforming exhaust valve 26. The exhaust pipe 27 is coupled with the intake pipe 11. Thus, the intake air from the intake pipe 11 can be partially supplied to the supply pipe 25. The supply pipe 25 is coupled with the exhaust pipe 13 through the EGR pipe 28. Thus, the exhaust air from the combustion chamber 9 of the outputting cylinder 2 can be partially supplied through the EGR pipe 28 as the EGR gas. Thus, the mixture (hereinafter simply referred to as "supply air") of the intake air and the EGR gas from the supply pipe 25 can be supplied to the expansion chamber 63 of the reforming cylinder 15b. The exhaust pipe 27 is coupled with the intake pipe 11, more on the downstream side than the supply pipe 25, via the mixer 27a. In the reforming cylinder 15b, the lower hydrocarbon fuel (hereinafter simply referred to as "reformed fuel"), obtained by reforming the mixture, can be discharged into the intake pipe 11 from the expansion chamber 63 through the exhaust pipe 27.

The intake pipe 11 includes the first intake regulating valve 30 that is more on the downstream side than the coupled position of the supply pipe 25, and is more on the upstream side than the coupled position of the exhaust pipe 27. The first intake regulating valve 30 includes an electromagnetic flow amount control valve. The first intake regulating valve 30 can change the opening of the first intake regulating valve 30 in accordance with a signal acquired from the ECU 60 as the control device described later. The first intake regulating valve 30, which is the electromagnetic flow amount control valve in the present embodiment, may be any valve that can change the flow amount of the intake air.

The supply pipe 25 is provided with the second intake regulating valve 31 that is more on the upstream side than the coupled position of the EGR pipe 28. The second intake regulating valve 31 includes an electromagnetic flow amount control valve. The second intake regulating valve 31 can change the opening of the second intake regulating valve 31 in accordance with a signal acquired from the ECU 60 described later. The second intake regulating valve 31, which is the electromagnetic flow amount control valve in the present embodiment, may be any valve that can change the flow amount of the intake air.

The EGR pipe 28 is provided with the EGR gas regulating valve 32. The EGR gas regulating valve 32 includes an electromagnetic flow amount control valve. The EGR gas regulating valve 32 can change the opening of the EGR gas regulating valve 32 in accordance with a signal acquired from the ECU 60 described below. The EGR gas regulating valve 32, which is the electromagnetic flow amount control valve in the present embodiment, may be any valve that can change the flow amount of the EGR gas.

In the engine 1 with this configuration, the mixture ratio between the intake air and the reformed fuel discharged from the expansion chamber 63 of the reforming cylinder 15b can be changed with the first intake regulating valve 30. In the engine 1, the mixture ratio between the intake air and the EGR gas supplied to the expansion chamber 63, can be changed with the second intake regulating valve 31 and the EGR gas regulating valve 32.

The intake air intercooler 33, the reformed fuel intercooler 34, and the EGR gas intercooler 35 cool gas. The intake air intercooler 33 is provided to the intake pipe 11. The intake air intercooler 33 can cool the intake air adiabatically compressed by the compressor 14b. The reformed fuel intercooler 34 is provided to the exhaust pipe 27. The reformed fuel intercooler 34 can cool the reformed fuel discharged from the expansion chamber 63 of the reforming cylinders 15. The reformed fuel intercooler 34 includes a heat radiator or a heat exchanger using air or water as the cooling medium. The EGR gas intercooler 35 is provided to the EGR pipe 28. The EGR gas intercooler 35 cools the exhaust air heated by fuel combustion.

The ECU 60 as the control device controls the engine 1. Specifically, the ECU 60 controls the secondary fuel injection device 6, the main fuel injection device 20, the first intake regulating valve 30, the second intake regulating valve 31, the EGR gas regulating valve 32, and the like. The ECU 60 stores therein various programs and data for controlling the engine 1. The ECU 60 may be connected to a CPU, a ROM, a RAM, an HDD, and the like via a bus, or may be a one-chip LSI or the like.

As illustrated in FIG. 6, the ECU 60 stores therein: various programs for controlling fuel injection; the main fuel injection amount map M1 for calculating the main fuel injection amount Qm based on the target rotational speed Np and the target output Wt of the engine 1; the intake air flow amount map M2 for calculating the outputting intake air flow amount A1 for supplying to the combustion chamber 9 of the outputting cylinder 2, based on the target rotational speed Np and the main fuel injection amount Qm; the mixture flow amount map M3 for calculating the reforming intake air flow amount A2 and the EGR gas flow amount A3 for supplying to the expansion chamber 63 of the reforming cylinder 15 based on the target rotational speed Np and the main fuel injection amount Qm; the secondary fuel injection amount map M4 for calculating the secondary fuel injection amount Qs for ignition to be injected into the combustion chamber 9 based on the target rotational speed Np and the main fuel injection amount Qm; and the like.

An operation mode of the components of the engine 1 according to one embodiment of the present invention is described below.

First of all, paths of intake air and exhaust air in the engine 1 are described.

As illustrated in FIG. 17, the outer air sucked in by the compressor 14b of the supercharger 14 is discharged to the intake pipe 11 as intake air in an adiabatically compressed state. The intake air is cooled by the intake air intercooler 33, and then is supplied to the combustion chamber 9 of the outputting cylinder 2 through the intake pipe 11. The intake air is partially supplied to the expansion chamber 63 of the reforming cylinder 15b via the supply pipe 25 coupled with the intake pipe 11 and the reforming intake valve 24.

The exhaust air from the combustion chamber 9 of the outputting cylinder 2 rotates the turbine 14a of the supercharger 14 through the exhaust pipe 13, and then is discharged outside. The exhaust air is partially supplied to the expansion chamber 63 of the reforming cylinder 15b as the EGR gas, through the EGR pipe 28 and the supply pipe 25 coupled with the EGR pipe 28.

The supply air (the intake air and the EGR gas) supplied to the expansion chamber 63 is supplied to the reaction chamber 64 through the communication hole 65. The supply air and the reformed fuel are discharged from the reaction chamber 64 to the expansion chamber 63, due to the suction caused by the movement of the reforming piston 18. The reforming piston 18 discharged from the expansion chamber 63 due to the compression caused by the movement of the reforming piston 18 is recirculated to the intake pipe 11, via the reforming exhaust valve 26 and through the exhaust pipe 27, to be supplied to the combustion chamber 9.

Next, how the ECU 60 calculates various predetermined amounts is described. As illustrated in FIG. 6, the ECU 60 calculates the main fuel injection amount Qm from the main fuel injection amount map M1, based on the target rotational speed Np and the target output Wt of the engine 1 determined in accordance with an operation amount on an unillustrated operation device and the like.

The ECU 60 calculates the outputting intake air flow amount A1 for supplying to the combustion chamber 9 of the outputting cylinder 2, from the intake air flow amount map M2, based on the target rotational speed Np and the main fuel injection amount Qm.

The ECU 60 calculates the reforming intake air flow amount A2 and the EGR gas flow amount A3 for supplying to the expansion chamber 63 of the reforming cylinder 15b, from the mixture flow amount map M3 based on the target rotational speed Np and the main fuel injection amount Qm.

The ECU 60 calculates the secondary fuel injection amount Qs of the igniting fuel supplied to the combustion chamber 9 of the outputting cylinder 2, from the secondary fuel injection amount map M4, based on the target rotational speed Np and the main fuel injection amount Qm The ECU 60 acquires the outputting crankshaft angle θ1 detected by the outputting crank angle detection sensor 8 and the reforming crankshaft angle θ2 detected by the reforming crank angle detection sensor 22, and calculates strokes of the outputting cylinders 2 and the reforming cylinders 15b.

Next, how fuel is reformed with the reforming cylinders 15 will be described with reference to FIG. 20 and FIG. 21.

Figure 20:
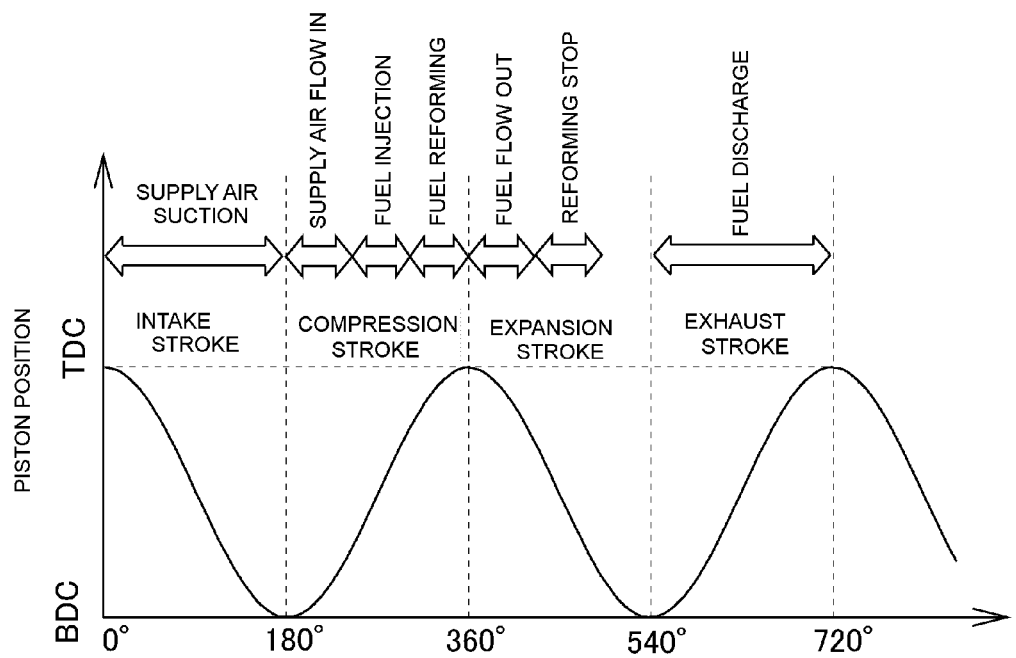
FIG. 20 is a chart representing a relationship between a crank position of the reforming cylinder and fuel injection timings in yet still another embodiment of the present invention.
Figure 21:
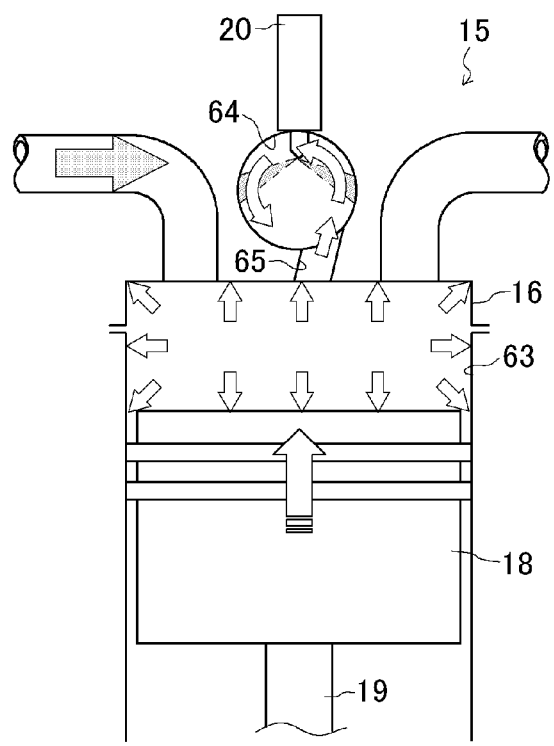
FIG. 21 is a schematic view illustrating flow of supply air in the reaction chamber in the reforming cylinder in yet still another embodiment of the present invention.

As illustrated in FIG. 20, when the reforming cylinder 15b is in the intake stroke, the reforming piston 18 moves from the top dead point to the bottom dead point. Thus, the internal pressure of the expansion chamber 63 of the reforming cylinder 15b drops due to the volume increase caused by the movement of the reforming piston 18. When the reforming cylinder 15b is in the intake stroke, the reforming intake valve 24 opens for supplying the supply air. The ECU 60 controls the opening and closing of the second intake regulating valve 31 based on the acquired reforming crankshaft angle θ2, in such a manner that the intake air is supplied into the expansion chamber 63 of the reforming cylinder 15b by the calculated reforming intake air flow amount A2, while the reforming cylinder 15b is in the intake stroke (for example, while the reforming piston 18 is close to the bottom dead point). Furthermore, the ECU 60 controls the opening and closing of the EGR gas regulating valve 32 in such a manner that the EGR gas is supplied into the expansion chamber 63 of the reforming cylinder 15b by the calculated EGR gas flow amount A3. Thus, the supply air (the intake air and the EGR gas) at an oxygen concentration suitable for fuel reforming is supplied to the expansion chamber 63 (supply air suction in FIG. 20).

When the reforming cylinder 15b is in the compression stroke, the reforming piston 18 moves from the bottom dead point to the top dead point. Thus, the internal pressure of the expansion chamber 63 of the reforming cylinder 15b increases due to the volume decrease caused by the movement of the reforming piston 18. Thus, the supply air supplied to the expansion chamber 63 is adiabatically compressed by the reforming piston 18. As illustrated in FIG. 21, the internal supply air in the expansion chamber 63 that has been adiabatically compressed flows into the reaction chamber 64 at high speed through the communication hole 65 (supply air flow in in FIG. 20). In this process, the supply air forms a high-speed swirling flow in the reaction chamber 64 due to the positional relationship between the reaction chamber 64 and the communication hole 65. The reforming cylinders 15b adiabatically compresses the supply air, whereby the high-temperature and the high-pressure state is achieved in the reaction chamber 64.

As illustrated in FIG. 20, when the reforming cylinder 15b is in the compression stroke, the ECU 60 controls the main fuel injection device 20 based on the acquired reforming crankshaft angle θ2, in such a manner that the fuel is supplied into the reaction chamber 64 of the reforming cylinder 15b by the calculated main fuel injection amount Qm. Thus, in the reforming cylinder 15b, the fuel is injected into the reaction chamber 64 that is in the high-temperature and high-pressure state with the high-sped swirling flow generated (fuel injection in FIG. 20). In the reaction chamber 64, the fuel is supplied for achieving the fuel air equivalence ratio required for the reforming into the lower hydrocarbon fuel by using the reforming intake air flow amount A2 of the intake air supplied to the expansion chamber 63 and the EGR gas flow amount A3 of the EGR gas.

The fuel injected into the reaction chamber 64 is dispersed and is quickly mixed (premixed) with the supply air in the reaction chamber 64 that is in the high-temperature and higher pressure state and has the high-speed swirling flow, to be evaporated. The injected fuel in the reaction chamber 64 partially adheres to an inner wall of the reaction chamber 64. The inner wall of the reaction chamber 64 has no object sliding thereon such as the reforming piston 18 in the expansion chamber 63. Thus, the fuel adhered on the inner wall of the reaction chamber 64 is exposed to the high-speed swirling flow in the high-temperature and high-pressure state to be evaporated and mixed with the supply air.

The reforming reaction of the fuel premixed with the supply air starts when the reforming piston 18 reaches a point close to the top dead point, that is, when the supply air and the fuel are in the highest-temperature and highest pressure state (fuel reforming in FIG. 20). In this process, the internal pressure of the reaction chamber 64 drops below the internal pressure of the expansion chamber 63 as the reforming reaction proceeds, and thus the mixture of the supply air and the fuel does not flow into the expansion chamber 63.

When the reforming cylinder 15b is in the expansion stroke, the reforming piston 18 moves from the top dead point to the bottom dead point. Thus, the internal pressure of the expansion chamber 63 of the reforming cylinder 15b drops due to the volume increase caused by the movement of the reforming piston 18. Thus, the reformed fuel in the reaction chamber 64 moves to the expansion chamber 63 (fuel flow out in FIG. 20). The reformed fuel flowed out from the reaction chamber 64 to the expansion chamber 63 is adiabatically expanded by the volume increase of the expansion chamber 63. Thus, the reformed fuel is cooled by the adiabatical expansion, and thus the low pressure state is achieved, whereby the reforming reaction stops (reforming stop in FIG. 20).

When the reforming cylinder 15b is in the exhaust stroke, the reforming piston 18 moves from the bottom dead point to the top dead point. Thus, the internal pressure of the expansion chamber 63 of the reforming cylinder 15b increases due to the volume drop caused by the movement of the reforming piston 18. When the reforming cylinder 15b is in the exhaust stroke, the reforming exhaust valve 26 is opened for discharging the reformed fuel from the expansion chamber 63. Thus, the reformed fuel is discharged from the expansion chamber 63 via the reforming exhaust valve 26, to be recirculated to the intake pipe 11 through the exhaust pipe 27 (fuel discharge in FIG. 20).

The reformed fuel is supplied as high temperature fuel gas to the exhaust pipe 27, due to residual heat, in the heat of the supply air, not used for endothermic decomposition reaction in the reforming. The high temperature reformed fuel supplied to the exhaust pipe 27 is cooled by the reformed fuel intercooler 34 of the exhaust pipe 27. Thus, self-preignition in the outputting cylinders 2 is prevented. The reformed fuel cooled by the reformed fuel intercooler 34 is supplied to the intake pipe 11 via the mixer 27a.

As described above, the reforming cylinder 15b has different spaces for adiabatic compression of the supply air and the fuel reforming. The reaction chamber 64 of the reforming cylinder 15b has no object sliding on the inner wall such as the reforming piston 18 in the expansion chamber 63. Thus, the fuel is entirely reformed without being scraped off by the reforming piston 18. Specifically, the predetermined amount of fuel injected into the supply air having a predetermined oxygen concentration is entirely endothermically decomposed to be gasified by the high-speed swirling flow in the reaction chamber 64 that is in the high-temperature and high-pressure state, while the reforming cylinder 15b is in the compression stroke. Thus, the fuel is reformed into the lower hydrocarbon fuel. Thus, the supplied reforming intake air flow amount A2, the EGR gas flow amount A3, and the main fuel injection amount Qm are sufficiently used for generating the reformed fuel in the reforming cylinder 15b. The top dead point of the reforming piston 18 can be determined to be at any position in the reforming cylinder 15b. Thus, the supply air amount remaining in the expansion chamber 63 decreases, whereby the oxidization of the reformed fuel at the time of adiabatic expansion is prevented. Thus, the injected fuel and the supply air can be sufficiently premixed quickly.

INDUSTRIAL APPLICABILITY

The present invention can be applied to an engine including a fuel reforming device.

REFERENCE SIGNS LIST

1 engine
2 outputting cylinder
11 intake air pipe
15 reforming cylinder
15a reforming cylinder
15b reforming cylinder
17 reforming cylinder
18 reforming piston
20 main fuel injection device
23 reaction chamber
28 EGR pipe
36a variable valve device
61 additive injection device
63 expansion chamber
64 reaction chamber
gf the amount of supplied fuel to reforming cylinder
gi the amount of suctioned gas of reforming cylinder
Gf the amount of reformed fuel

The invention claimed is:

1. An engine comprising:
   an outputting cylinder configured to combust fuel; and
   a reforming cylinder configured to reform the fuel through back and forth movement of a piston,
   wherein an amount of reformed fuel supplied to the outputting cylinder is changed in accordance with an output from the outputting cylinder, while maintaining an amount of supplied fuel and an amount of suctioned gas to one reforming cylinder.
2. The engine according to claim 1, wherein at least one of a compression rate and an expansion rate of the reforming cylinder is changed based on temperature of reformed fuel discharged from the reforming cylinder.
3. The engine according to claim 1,
   wherein the reforming cylinder includes
      an expansion chamber changing a volume thereof in accordance with the back and forth movement of the piston; and
      a reaction chamber with a constant volume,
   wherein the expansion chamber and the reaction chamber are in communication with each other.
4. The engine according to claim 1,
   wherein the reforming cylinder is coupled with an intake air pipe through which intake air from outside is supplied and an EGR pipe through which exhaust air from the outputting cylinder is supplied, and
   wherein the reforming cylinder is provided with a fuel injection device that supplies fuel to a mixture of the intake air and the exhaust air supplied to the reforming cylinder and an additive injection device that supplies an additive based on an amount of supplied fuel and an amount of the mixture.

* * * * *